United States Patent
Kurihara et al.

(10) Patent No.: US 9,495,235 B2
(45) Date of Patent: Nov. 15, 2016

(54) IDENTIFYING A PHYSICAL DEVICE IN WHICH A FAULT HAS OCCURRED IN A STORAGE SYSTEM

(71) Applicant: Hitachi, Ltd., Tokyo (JP)

(72) Inventors: Tomoaki Kurihara, Tokyo (JP); Tsutomu Koga, Tokyo (JP); Hideyuki Ihara, Yokohama (JP)

(73) Assignee: HITACHI, LTD., Tokyo (JP)

( * ) Notice: Subject to any disclaimer, the term of this patent is extended or adjusted under 35 U.S.C. 154(b) by 278 days.

(21) Appl. No.: 14/377,602

(22) PCT Filed: Nov. 18, 2013

(86) PCT No.: PCT/JP2013/081003
§ 371 (c)(1),
(2) Date: Aug. 8, 2014

(87) PCT Pub. No.: WO2015/072028
PCT Pub. Date: May 21, 2015

(65) Prior Publication Data
US 2016/0246671 A1    Aug. 25, 2016

(51) Int. Cl.
*G06F 11/00* (2006.01)
*G06F 11/07* (2006.01)
(Continued)

(52) U.S. Cl.
CPC ........... *G06F 11/079* (2013.01); *G06F 3/0619* (2013.01); *G06F 3/0629* (2013.01); *G06F 3/0689* (2013.01); *G06F 11/076* (2013.01); *G06F 11/108* (2013.01); *G06F 11/1012* (2013.01); *G06F 11/327* (2013.01)

(58) Field of Classification Search
None
See application file for complete search history.

(56) References Cited

U.S. PATENT DOCUMENTS 5,519,830 A * 5/1996 Opoczynski .............. H04L 1/22
714/4.2
7,779,306 B1 * 8/2010 Philbin ............... G06F 11/0727
370/216

(Continued)

FOREIGN PATENT DOCUMENTS

JP    2006-119878 A    5/2006
JP    2010-176513 A    8/2010
(Continued)

Primary Examiner — Gabriel Chu
(74) Attorney, Agent, or Firm — Volpe and Koenig, P.C.

(57) ABSTRACT

Each transfer route includes an FE I/F out of a plurality of FE I/Fs, a BE I/F out of a plurality of BE I/Fs, at least one memory out of one or more memories, and at least one processor out of one or more processors. I/O target data is transferred via a target transfer route including an FE I/F that has received an I/O request out of a plurality of transfer routes. A processor in the target transfer route generates routing information representing a physical device included in the target transfer route, and transmits a transfer indication including the routing information to at least one of the FE I/F and BE I/F in the target transfer route. In response to the transfer indication, at least one of the FE I/F and BE I/F in the target transfer route adds, to the I/O target data, a guarantee code.

15 Claims, 28 Drawing Sheets

(51) Int. Cl.
*G06F 11/10* (2006.01)
*G06F 11/32* (2006.01)
*G06F 3/06* (2006.01)

(56) References Cited

U.S. PATENT DOCUMENTS

| | | | | |
|---|---|---|---|---|
| 2002/0194524 A1* | 12/2002 | Wiley | ............... | H04L 1/0061 |
| | | | | 714/4.5 |
| 2011/0154165 A1 | 6/2011 | Primadani et al. | | |
| 2011/0173504 A1 | 7/2011 | Kabakura | | |
| 2014/0071835 A1* | 3/2014 | Sun | ............... | H04L 41/0677 |
| | | | | 370/242 |
| 2014/0344630 A1* | 11/2014 | Sampei | ............... | G06F 11/0727 |
| | | | | 714/48 |
| 2015/0089332 A1* | 3/2015 | Chambers | ............ | H03M 13/6306 |
| | | | | 714/807 |

FOREIGN PATENT DOCUMENTS

| | | |
|---|---|---|
| JP | 2011-145823 A | 7/2011 |
| JP | 2011-232910 A | 11/2011 |
| JP | 2012-519317 A | 8/2012 |

* cited by examiner

Fig. 2

200 Error count table

| Type | ID | Error count |
|---|---|---|
| FC Chip | 1A | 0 |
|  | 1B | 0 |
|  | 1C | 0 |
|  | 1D | 0 |
| CPU | 1A | 0 |
|  | 1B | 0 |
| Memory | 1A | 0 |
|  | 1B | 0 |
| SAS Chip | 1A | 0 |
|  | 1B | 0 |
|  | 1C | 0 |
|  | 1D | 0 |

| Type | ID | Error count |
|---|---|---|
| FC Chip | 2A | 0 |
|  | 2B | 0 |
|  | 2C | 0 |
|  | 2D | 0 |
| CPU | 2A | 0 |
|  | 2B | 0 |
| Memory | 2A | 0 |
|  | 2B | 0 |
| SAS Chip | 2A | 0 |
|  | 2B | 0 |
|  | 2C | 0 |
|  | 2D | 0 |

| Type | ID | Error count |
|---|---|---|
| Drive | 1 | 0 |
|  | 2 | 0 |
|  | ... | ... |

Fig. 3

300 Threshold table

| Type | ID | Threshold |
|---|---|---|
| FC Chip | 1A | XXXX |
|  | 1B | XXXX |
|  | 1C | XXXX |
|  | 1D | XXXX |
| CPU | 1A | XXXX |
|  | 1B | XXXX |
| Memory | 1A | XXXX |
|  | 1B | XXXX |
|  | 1C | XXXX |
|  | 1D | XXXX |
|  | 1E | XXXX |
|  | 1F | XXXX |
|  | 1G | XXXX |
|  | 1H | XXXX |
| SAS Chip | 1A | XXXX |
|  | 1B | XXXX |
|  | 1C | XXXX |
|  | 1D | XXXX |

| Type | ID | Threshold |
|---|---|---|
| FC Chip | 2A | XXXX |
|  | 2B | XXXX |
|  | 2C | XXXX |
|  | 2D | XXXX |
| CPU | 2A | XXXX |
|  | 2B | XXXX |
| Memory | 2A | XXXX |
|  | 2B | XXXX |
|  | 2C | XXXX |
|  | 2D | XXXX |
|  | 2E | XXXX |
|  | 2F | XXXX |
|  | 2G | XXXX |
|  | 2H | XXXX |
| SAS Chip | 2A | XXXX |
|  | 2B | XXXX |
|  | 2C | XXXX |
|  | 2D | XXXX |

| Type | ID | Threshold |
|---|---|---|
| Drive | 1 | XXXX |
|  | 2 | XXXX |
|  | ... | ... |

Fault device table 400

| Type | ID | Replacement portion |
|---|---|---|
| FC Chip | 1A | FC Chip1A |
| | 1B | FC Chip1B |
| | 1C | FC Chip1C |
| | 1D | FC Chip1D |
| CPU | 1A | CPU1A |
| | 1B | CPU1B |
| Memory | 1A | Memory1A |
| | 1B | Memory1B |
| | 1C | Memory1C |
| | 1D | Memory1D |
| | 1E | Memory1E |
| | 1F | Memory1F |
| | 1G | Memory1G |
| | 1H | Memory1H |
| SAS Chip | 1A | SAS Chip1A |
| | 1B | SAS Chip1B |
| | 1C | SAS Chip1C |
| | 1D | SAS Chip1D |

| Type | ID | Replacement portion |
|---|---|---|
| FC Chip | 2A | FC Chip2A |
| | 2B | FC Chip2B |
| | 2C | FC Chip2C |
| | 2D | FC Chip2D |
| CPU | 2A | CPU2A |
| | 2B | CPU2B |
| Memory | 2A | Memory2A |
| | 2B | Memory2B |
| | 2C | Memory2C |
| | 2D | Memory2D |
| | 2E | Memory2E |
| | 2F | Memory2F |
| | 2G | Memory2G |
| | 2H | Memory2H |
| SAS Chip | 2A | SAS Chip2A |
| | 2B | SAS Chip2B |
| | 2C | SAS Chip2C |
| | 2D | SAS Chip2D |

| Type | ID | Replacement portion |
|---|---|---|
| Drive | 1 | Drive 1 |
| | 2 | Drive 2 |
| | ... | ... |

| | Bit 0 | Bit 1 | Bit 2 | Bit 3 | Bit 4 | Bit 5 | Bit 6 | Bit 7 |
|---|---|---|---|---|---|---|---|---|
| Byte 0 | Data ||||||||
| Byte 1 | Data ||||||||
| ... | . . . ||||||||
| Byte 511 | Data ||||||||
| Byte 512 | DIF CRC ||||||||
| Byte 513 | DIF CRC ||||||||
| Byte 514 | LOGICAL BLOCK APPLICATION TAG ||||||||
| Byte 515 | LOGICAL BLOCK APPLICATION TAG ||||||||
| Byte 516 | Routing information ||||||||
| Byte 517 | Routing information ||||||||
| Byte 518 | Logical Block Reference Tag ||||||||
| Byte 519 | Logical Block Reference Tag ||||||||

| FC 1A | FC 1B | FC 1C | FC 1D | CPU 1A | CPU 1B | MEM 1A | MEM 1B |
|---|---|---|---|---|---|---|---|
| 1 | 0 | 0 | 0 | 1 | 0 | 1 | 0 |
| SAS 1A | SAS 1B | SAS 1C | SAS 1D | FC 2A | FC 2B | FC 2C | FC 2D |
| 0 | 0 | 0 | 0 | 0 | 0 | 0 | 0 |
| CPU 2A | CPU 2B | MEM 2A | MEM 2B | SAS 2A | SAS 2B | SAS 2C | SAS 2D |
| 0 | 0 | 0 | 0 | 0 | 0 | 0 | 0 |

- Transfer indication #1
- Command for write indication
- Transfer source address
- Transfer destination address
- Transfer length

| LOGICAL BLOCK APPLICATION TAG | | | | | | | | 503 |
|---|---|---|---|---|---|---|---|---|
| FC 1A | FC 1B | FC 1C | FC 1D | CPU 1A | CPU 1B | MEM 1A | MEM 1B | |
| 1 | 0 | 0 | 0 | 1 | 0 | 1 | 0 | |
| SAS 1A | SAS 1B | SAS 1C | SAS 1D | FC 2A | FC 2B | FC 2C | FC 2D | |
| 0 | 0 | 0 | 0 | 0 | 0 | 0 | 0 | |
| CPU 2A | CPU 2B | MEM 2A | MEM 2B | SAS 2A | SAS 2B | SAS 2C | SAS 2D | |
| 0 | 0 | 0 | 0 | 0 | 0 | 0 | 0 | |
| Logical Block Reference Tag | | | | | | | | 610 |

Fig. 9b

Transfer indication #2 (503):
- Command for write indication
- Transfer source address
- Transfer destination address
- Transfer length
- LOGICAL BLOCK APPLICATION TAG
- Logical Block Reference Tag (610)

| FC 1A | FC 1B | FC 1C | FC 1D | CPU 1A | CPU 1B | MEM 1A | MEM 1B |
|---|---|---|---|---|---|---|---|
| 1 | 0 | 0 | 0 | 1 | 0 | 1 | 0 |

| SAS 1A | SAS 1B | SAS 1C | SAS 1D | FC 2A | FC 2B | FC 2C | FC 2D |
|---|---|---|---|---|---|---|---|
| 1 | 0 | 0 | 0 | 0 | 0 | 0 | 0 |

| CPU 2A | CPU 2B | MEM 2A | MEM 2B | SAS 2A | SAS 2B | SAS 2C | SAS 2D |
|---|---|---|---|---|---|---|---|
| 0 | 0 | 0 | 0 | 0 | 0 | 0 | 0 |

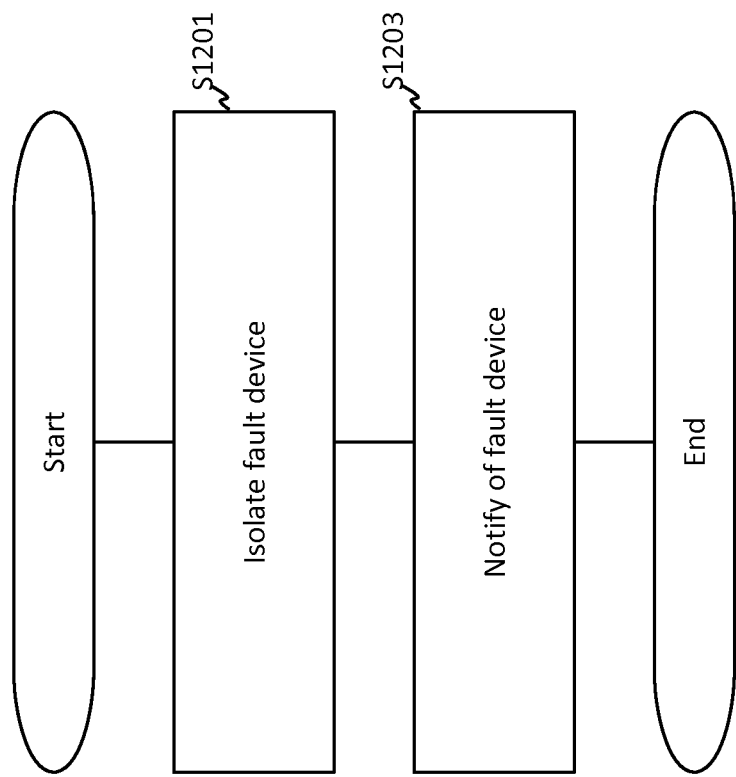

Fig. 13

| Device | State |
|---|---|
| CPU 1A | Normal |
| CPU 1B | Normal |
| Memory 1A | Normal |
| Memory 1B | Normal |
| FC 1A | Normal |
| FC 1B | Normal |
| FC 1C | Normal |
| FC 1D | Normal |
| SAS 1A | Normal |
| SAS 1B | Normal |
| SAS 1C | Normal |
| SAS 1D | Normal |

| Device | State |
|---|---|
| CPU 2A | Normal |
| CPU 2B | Normal |
| Memory 2A | Normal |
| Memory 2B | Normal |
| FC 2A | Abnormal |
| FC 2B | Normal |
| FC 2C | Normal |
| FC 2D | Normal |
| SAS 2A | Normal |
| SAS 2B | Normal |
| SAS 2C | Normal |
| SAS 2D | Normal |

| Device | State |
|---|---|
| Drive 1 | Normal |
| Drive 2 | Normal |
| . . . | . . . |

Fig. 15a

Transfer indication #4
- Command for write indication
- Transfer source address
- Transfer destination address
- Transfer length

| LOGICAL BLOCK APPLICATION TAG | | | | | | | | | 503 |
|---|---|---|---|---|---|---|---|---|---|
| FC 1A | FC 1B | FC 1C | FC 1D | CPU 1A | CPU 1B | MEM 1A | MEM 1B | | |
| 1 | 0 | 0 | 0 | 1 | 0 | 1 | 0 | | |
| SAS 1A | SAS 1B | SAS 1C | SAS 1D | FC 2A | FC 2B | FC 2C | FC 2D | | |
| 0 | 0 | 0 | 0 | 0 | 0 | 0 | 0 | | |
| CPU 2A | CPU 2B | MEM 2A | MEM 2B | SAS 2A | SAS 2B | SAS 2C | SAS 2D | | |
| 0 | 0 | 0 | 0 | 0 | 0 | 0 | 0 | | |

Logical Block Reference Tag

Fig. 15b

| | | | | | | | | | | |
|---|---|---|---|---|---|---|---|---|---|---|
| Transfer indication #5 | | | | | | | | | | |
| Command for write indication | | | | | | | | | | |
| Transfer source address | | | | | | | | | | |
| Transfer destination address | | | | | | | | | | |
| Transfer length | | | | | | | | | | |
| LOGICAL BLOCK APPLICATION TAG | FC 1A | FC 1B | FC 1C | FC 1D | CPU 1A | CPU 1B | MEM 1A | MEM 1B | | |
| | 1 | 0 | 0 | 0 | 1 | 1 | 1 | 0 | | |
| | SAS 1A | SAS 1B | SAS 1C | SAS 1D | FC 2A | FC 2B | FC 2C | FC 2D | | |
| | 0 | 0 | 0 | 0 | 0 | 0 | 0 | 0 | | |
| | CPU 2A | CPU 2B | MEM 2A | MEM 2B | SAS 2A | SAS 2B | SAS 2C | SAS 2D | | |
| | 1 | 1 | 0 | 1 | 0 | 0 | 0 | 0 | | |
| Logical Block Reference Tag | | | | | | | | | | |

Transfer indication #7
- Command for read indication
- Transfer source address
- Transfer destination address
- Transfer length

LOGICAL BLOCK APPLICATION TAG (503)

| FC 1A | FC 1B | FC 1C | FC 1D | CPU 1A | CPU 1B | MEM 1A | MEM 1B |
|---|---|---|---|---|---|---|---|
| 0 | 0 | 0 | 0 | 0 | 1 | 0 | 1 |
| SAS 1A | SAS 1B | SAS 1C | SAS 1D | FC 2A | FC 2B | FC 2C | FC 2D |
| 0 | 1 | 0 | 0 | 0 | 0 | 0 | 0 |
| CPU 2A | CPU 2B | MEM 2A | MEM 2B | SAS 2A | SAS 2B | SAS 2C | SAS 2D |
| 0 | 0 | 0 | 0 | 0 | 0 | 0 | 0 |

Logical Block Reference Tag

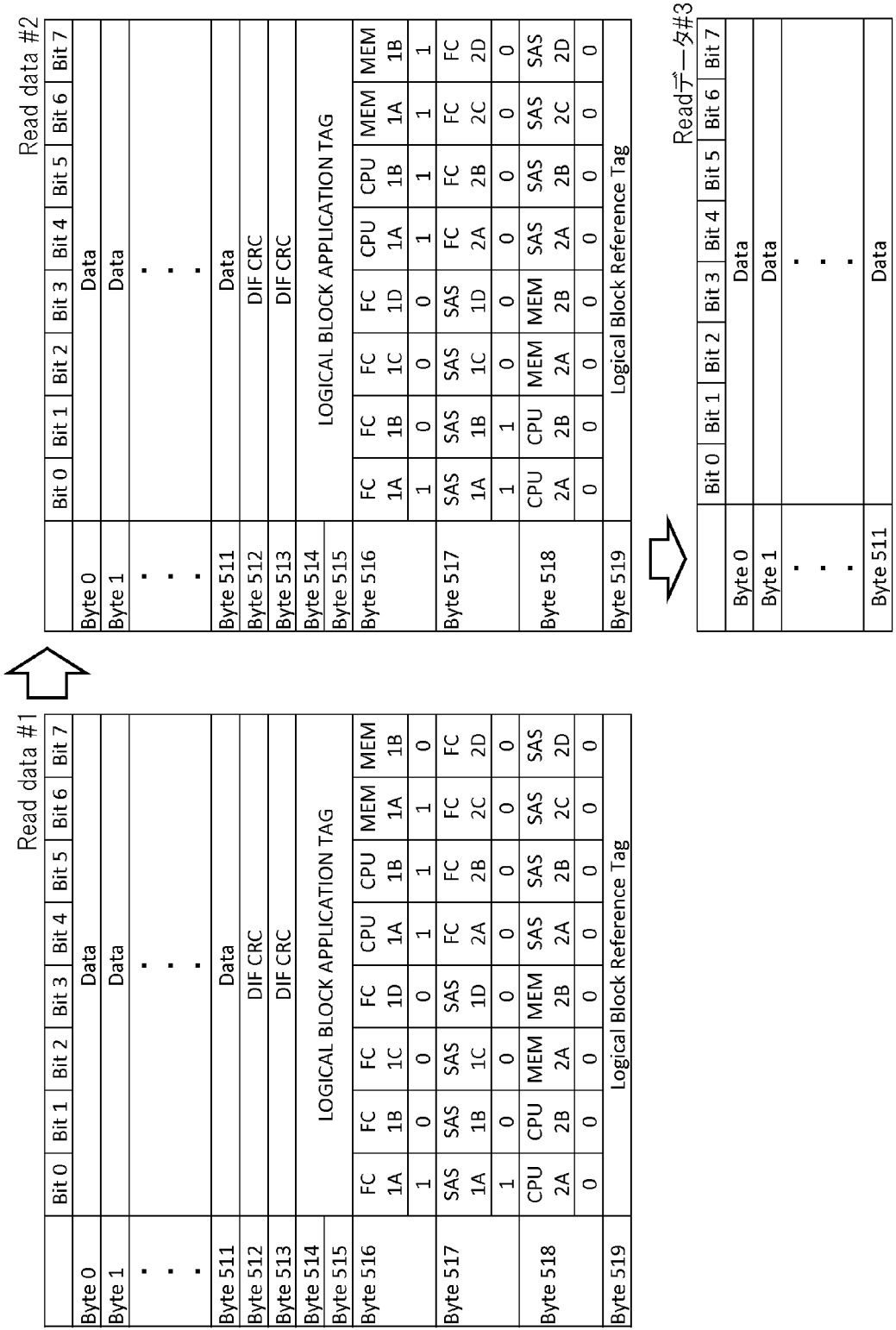

Fig. 23a

Transfer indication #10

| Command for write or read indication |
|---|
| Transfer source address |
| Transfer destination address |
| Transfer length |

LOGICAL BLOCK APPLICATION TAG

| FC 1A | FC 1B | FC 1C | FC 1D | CPU 1A | CPU 1B | MEM 1A | MEM 1B |
|---|---|---|---|---|---|---|---|
| 0 | 0 | 0 | 0 | 0 | 1 | 0 | 1 |
| SAS 1A | SAS 1B | SAS 1C | SAS 1D | FC 2A | FC 2B | FC 2C | FC 2D |
| 0 | 1 | 0 | 0 | 0 | 0 | 0 | 0 |
| CPU 2A | CPU 2B | MEM 2A | MEM 2B | SAS 2A | SAS 2B | SAS 2C | SAS 2D |
| 0 | 0 | 0 | 0 | 0 | 0 | 0 | 0 |

Logical Block Reference Tag

IDENTIFYING A PHYSICAL DEVICE IN WHICH A FAULT HAS OCCURRED IN A STORAGE SYSTEM

TECHNICAL FIELD

The present invention relates to a technique of identifying a physical device in which a fault has occurred in a storage system.

BACKGROUND ART

In a storage system including a storage control apparatus and a physical storage apparatus, the storage control apparatus performs a write process or read process with respect to the physical storage apparatus in response to a write request or read request transmitted from a host computer.

For the write process or read process of data, there are cases where the storage control apparatus has a data guarantee function so that the reliability of the storage system is ensured. For the data guarantee function, a technique of generating a guarantee code with which a data error in target data is detected and adding a guarantee code to the target data in data transfer for transfer as write data or read data is known. As a guarantee code, an error correcting code (ECC) is known (PTL 1), for example. In recent years, Data Integrity Field (DIF) proposed by T10 that is a storage interface technical committee is also known as a standard format for a guarantee code.

CITATION LIST

Patent Literature

[PTL 1]
Japanese Patent Application Laid-open No. 2011-232910

SUMMARY OF INVENTION

Technical Problem

In the case where a fault has occurred in a storage system, it is important to identify a fault device, i.e., physical device in which the fault has occurred, in order to continue operation of the storage system. However, identification of a fault device is difficult with only the data guarantee function described above. This is because identification of a transfer route of data including a fault device out of a plurality of data transfer routes coupled to a host computer and a physical storage apparatus is difficult.

Solution to Problem

In order to solve a task described above, a storage control apparatus that is one aspect of the present invention is coupled to one or more storage devices and one or more host computers and executes, in response to an input/output (I/O) request from a host computer out of the one or more host computers, an I/O process in which I/O of I/O target data according to the I/O request is performed with respect to a storage device, which is an I/O destination, out of the one or more storage devices. The storage control apparatus includes a plurality of physical devices included in a plurality of transfer routes coupled to the one or more host computers. The plurality of physical devices include a plurality of front-end interface devices (FE I/Fs) coupled to the one or more host computers, a plurality of back-end interface devices (BE I/Fs) coupled to the one or more storage devices, one or more memories, and one or more processors. Each transfer route includes an FE I/F out of the plurality of FE I/Fs, a BE I/F out of the plurality of BE I/Fs, at least one memory out of the one or more memories, and at least one processor out of the one or more processors. The I/O target data is transferred via a target transfer route that is a transfer route including an FE I/F that has received the I/O request out of the plurality of transfer routes. A processor in the target transfer route generates routing information representing a physical device included in the target transfer route, and transmits a transfer indication including the routing information to at least one of the FE I/F and BE I/F in the target transfer route. At least one of the FE I/F and BE I/F in the target transfer route adds, to the I/O target data, a guarantee code that is a code with which an error in data is detected and that includes routing information within the transfer indication, in response to the transfer indication.

Advantageous Effects of Invention

With one aspect of the present invention, identification of a physical device in which a fault has occurred can be performed easily in the case where a fault has occurred in a storage system.

BRIEF DESCRIPTION OF DRAWINGS

FIG. 2 shows an error count table 200.
FIG. 3 shows a threshold table 300.
FIG. 4 shows a fault device table 400.
FIG. 6 shows a DIF format in which routing information 610 is embedded.
FIG. 7 shows one example of the routing information 610.
FIG. 9a shows one example of a transfer indication #1.
FIG. 9b shows one example of a transfer indication #2.
FIG. 12 is a flowchart of a fault device identification post-process.
FIG. 13 shows one example of information of a displayed fault device list.
FIG. 15a shows one example of a transfer indication #4.
FIG. 15b shows one example of a transfer indication #5.
FIG. 18a shows one example of a transfer indication #7.
FIG. 19 shows the flow of read data in the first read process.
FIG. 23a shows one example of a transfer indication #10.

DESCRIPTION OF EMBODIMENT

Although information is described with expressions such as "aaa table" in the description below, such information may be expressed apart from a data structure such as a table. Therefore, in order to show non-dependence upon data structure, "aaa table" or the like may be referred to as "aaa information."

Further, upon describing the content of each piece of information, expressions such as "identification information," "identifier," "name," or "ID" are used. However, these are interchangeable.

In the description below, there are cases where description is made with a "program" as a subject. However, since a program is executed by a processor to perform a predetermined process while using a memory and communication interface, a description of a process in which a program is a subject may be a description in which a processor is a subject. It may be an apparatus including the processor that performs a process. A part or all of a process performed by a program may be realized by dedicated hardware. A program may be installed in a computer by a program distribution server or a recording medium readable by a computer.

In the respective drawings, common components are illustrated with the same reference sign. Regarding common components, a separate number or the like such as #1A or #2B is added at the end of a number for illustration, in the case of distinguishing each component. However, there are cases where the number or the like is omitted in the illustration according to necessity.

Hereinafter, an example of the present invention will be described using the drawings and the like. The example below shows a specific example of the content of the present invention. The present invention is not limited to this example, and various changes and modifications are possible by those skilled in the art within the scope of the technical idea disclosed in this description.

Hereinafter, the configuration of a computer system of this example will be described.

Figure 1:
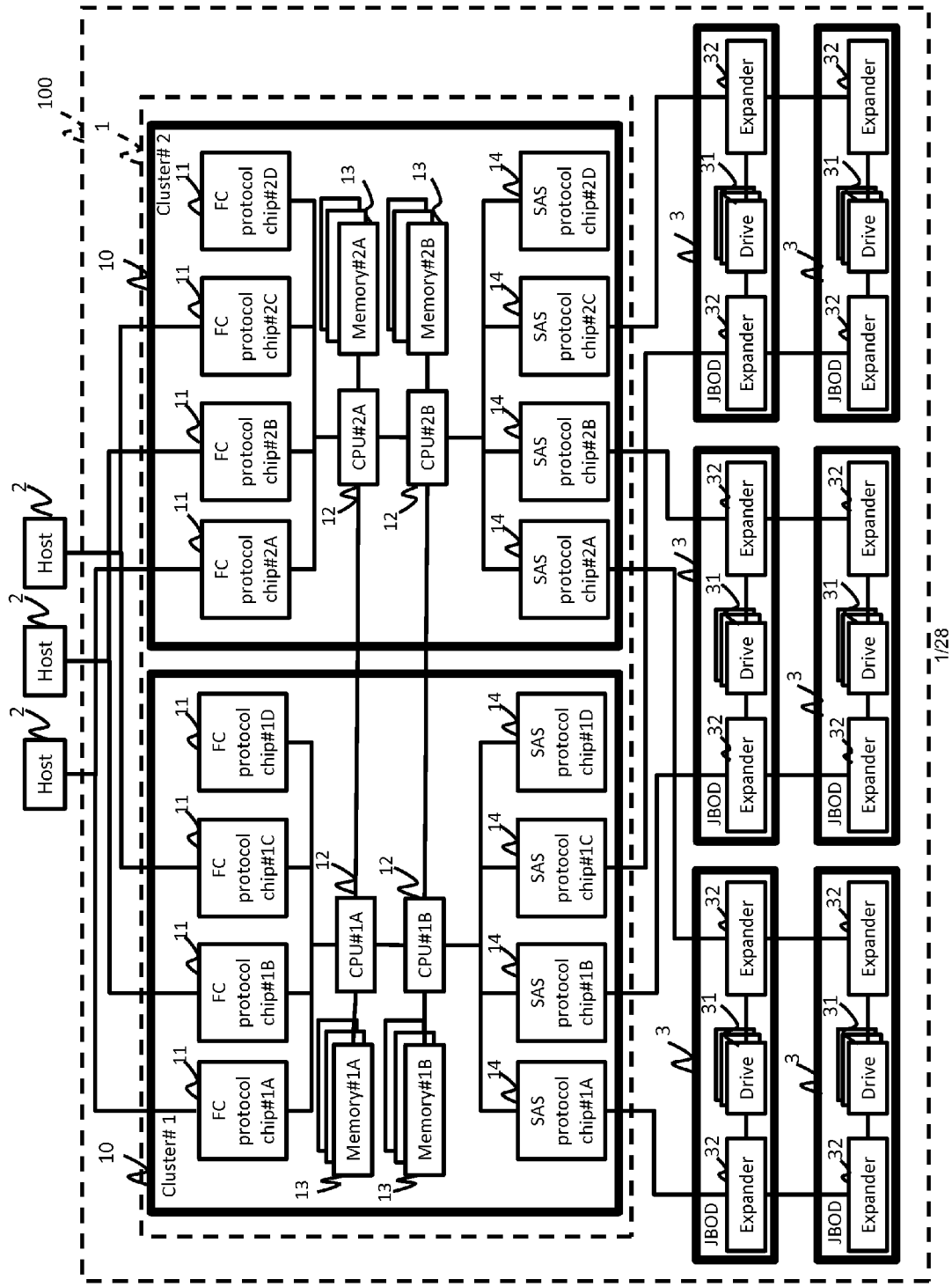
FIG. 1 shows the configuration of a computer system in one example.

FIG. 1 shows the configuration of the computer system in this example.

The computer system includes a plurality of host computers (hereinafter, simply hosts) 2 and a storage system 100. The storage system 100 includes a plurality of just a bunch of disks (JBODs) 3 and a storage control apparatus 1. The plurality of hosts 2 are each coupled to the storage control apparatus 1 via a storage area network (SAN), for example. The plurality of JBODs 3 are coupled to the storage control apparatus 1. In FIG. 1, a plurality of JBOD arrays (one or more JBODs 3 coupled in series) are coupled to the storage control apparatus 1. The number of hosts 2 and JBODs 3 within the computer system may be one.

The plurality of JBODs 3 each include a plurality of drives 31 and a plurality of expanders 32. There may be one drive 31 and expander 32 inside each JBOD 3. The JBOD 3 is coupled to the storage control apparatus 1 and another JBOD 3 via the expander 32. Inside the JBOD 3, the drive 31 and the expander 32 are coupled. The drive 31 is a physical storage device and, in this example, is a Serial Attached Small Computer System Interface (SAS)-hard disk drive (HDD). However, other physical devices, e.g., a hard disk drive such as a Serial Advanced Technology Attachment (SATA)-HDD is also acceptable, and a semiconductor storage device such as a solid state drive (SSD) is also acceptable. A redundant arrays of inexpensive disks (RAID) group may be configured of a plurality of drives 31 in one JBOD 3 or a plurality of drives 31 in a plurality of JBODs 3. Based on one drive 31 or a plurality of drives 31 that form one RAID group, one or a plurality of logical units (LUs) are provided to the host 2. An LU provided to the host 2 may be a virtual LU (e.g., LU according to thin provisioning) instead of an LU based on the drive 31.

The storage control apparatus 1 is made redundant by two storage controllers 10 that are respectively independent. Hereinafter, there are cases where each storage controller 10 is referred to as cluster 10. Each cluster 10 is of the same configuration. Therefore, only the configuration of a cluster #1 will be described below. However, two clusters 10 may be of different configurations. Although the storage control apparatus 1 is made redundant by two clusters 10 in this example, this is not limiting. The storage control apparatus 1 may be made redundant with three or more clusters 10 or may be configured only of one cluster 10.

The cluster 10 includes a plurality of central processing units (CPUs) 12, a plurality of memories 13, a plurality of Fibre Channel (FC) protocol chips 11, and a plurality of SAS protocol chips 14. Respective units of the cluster 10 are coupled with each other via a bus. The memory 13 stores a program and data for controlling the storage system 100. The CPU 12 controls the storage system 100 according to a program stored in the memory 13. The FC protocol chip 11 performs (front-end) communication with the host 2. The SAS protocol chip 14 is coupled to the expander 32 of the JBOD 3 and performs (back-end) communication with the JBOD 3. In the description below and drawings, the SAS protocol chip 14 may be referred to as SAS chip 14. In the description below and drawings, the FC protocol chip 11 may be referred to as FC chip 11. Although the FC chip 11 and the SAS chip 14 are respectively used as a front-end communication interface and a back-end communication interface in this example, this is not limiting.

The clusters 10 are coupled to be capable of communication. For example, a CPU #1A of the cluster #1 is coupled to a CPU #2A of a cluster #2, and a CPU #1B of the cluster #1 is coupled to a CPU #2B of the cluster #2.

Coupling is such that any drive 31 can be accessed from both the clusters #1 and #2. The drive 31 that can be accessed from a SAS chip #1A via one or more expanders 32 can also be accessed from a SAS #2A via one or more different expanders 32.

The memory 13 of each cluster 10 stores data including a table shown in FIG. 2 to FIG. 4. Data within the memories 13 of a plurality of clusters 10 may be synchronized. For example, in the case where a table is created or updated in the memory 13 of one cluster 10, the same table may be created or updated in the memory 13 of the other cluster 10.

FIG. 2 shows an error count table 200.

The error count table 200 is a table that manages the error count of each physical device. Specifically, in the case where a data error has occurred in write data or read data at the time of a write process or read process, for example, the error count for a physical device present in a data transfer route for such data is recorded in the error count table 200. The error count table 200 is stored in each memory 13 of the respective clusters 10. The error count table 200 includes an entry for each physical device within the storage system 100. Each entry includes a type 201 showing the type of a physical device, an ID 202 showing the ID of a physical device, and an error count 203 showing the number of occurrences of error in a physical device.

FIG. 3 shows a threshold table 300.

The threshold table 300 is a table that manages the threshold for the error count of each physical device. Specifically, for example, a threshold for an error count that is a basis of fault determination for each physical device is set in the threshold table 300. The threshold table 300 is stored in each memory 13 of the respective clusters 10. The threshold table 300 includes an entry for each physical device within the storage system 100. Each entry includes a type 301 showing the type of a physical device, an ID 302 showing the ID of a physical device, and a threshold 303 showing the threshold for the error count of a physical device.

FIG. 4 shows a fault device table 400.

The fault device table 400 is a table for managing a physical device with a fault. Specifically, for example, identification information on whether or not each physical device is a fault device is recorded in the fault device table 400. The fault device table 400 is stored in each memory 13 of the respective clusters 10. The fault device table 400 includes an entry for each physical device within the storage system 100. Each entry includes a type 401 showing the type of a physical device, an ID 402 showing the ID of a physical device, and a replacement portion 403 showing the name of a physical device.

Hereinafter, a fault identification method for a physical device inside the storage system 100 will be described.

In this example, fault detection of a physical device is performed based on routing information added to transfer target data such as write data (data of a write target) or read data (data of a read target) upon data transfer in a write process, read process, or the like. Specifically, for example, transfer target data is block data, and the block data is added with DIF data as a guarantee code including routing information upon data transfer. Based on detection of an error in block data with DIF data, a physical device can be detected from routing information within the DIF data. Although write data or read data is handled in block units in this example, this is not limiting.

Figure 5:
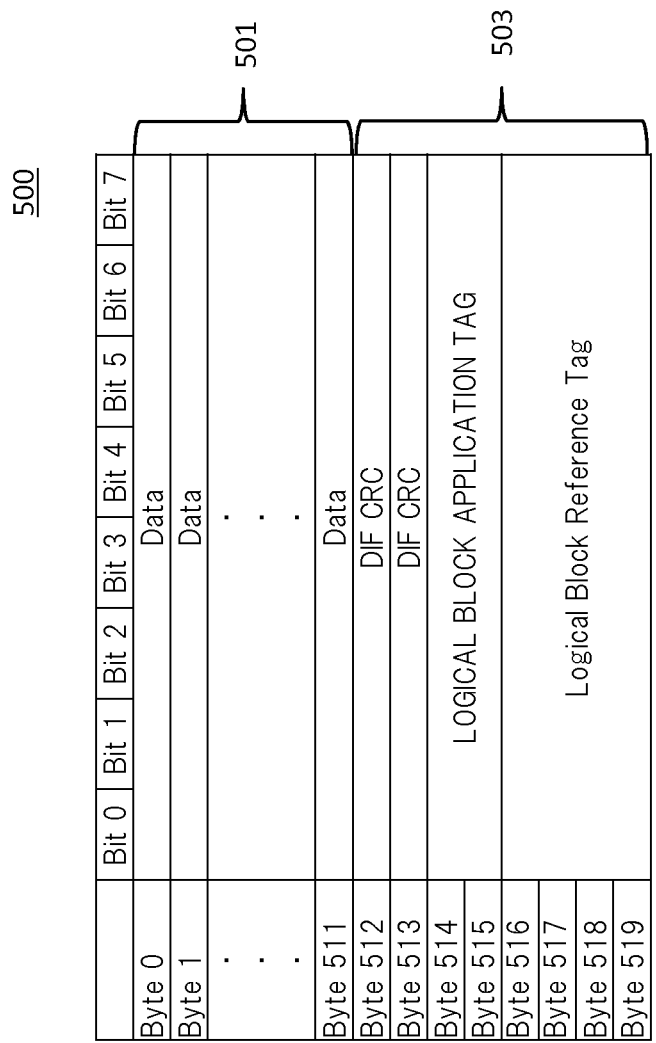
FIG. 5 shows one example of a format 500 for DIF.

FIG. 5 shows one example of a format 500 for DIF.

In this example, a DIF code 503 of 8 bytes (bytes 512 to 519) is added to block data 501 of 512 bytes (bytes 0 to 511) in the format 500 for DIF. The DIF code 503 is formed of, for example, a DIF cyclic redundancy check (CRC) of 2 bytes (bytes 512 and 513), a logical block application tag of 2 bytes (bytes 514 and 515), and a logical block reference tag of 2 bytes (bytes 516 and 517).

The DIF CRC is a code for detecting a bit error in data and stores a CRC calculation result with respect to the block data 501 of 512 bytes. For the logical block application tag and the logical block reference tag, an arbitrary value is configurable by a user. In this example, the transfer order of the block data 501 upon transferring one or more pieces of block data 501 is stored in the logical block application tag. In this example, as shown in FIG. 6, a part or all of the logical block reference tag stores routing information 610.

FIG. 7 shows one example of the routing information 610.

The routing information 610 is created by the CPU 12 based on a write (read) request and write (read) data upon data transfer. The routing information 610 is information showing whether or not each physical device within the storage control apparatus 1 is included in a transfer route for transfer target data. Specifically, for example, each bit forming the routing information 610 is associated with a physical device within the storage control apparatus 1, such that a bit corresponding to a physical device included in a transfer route is "1" and a bit corresponding to a physical device not included in the transfer route is "0." At each stage upon data transfer, the CPU 12 may create or update the routing information 610. At this time, the CPU 12 may calculate a part of physical devices included in a transfer route from a write (read) request, write (read) data, or the like at each stage or may calculate all physical devices included in a transfer route.

Figure 8:
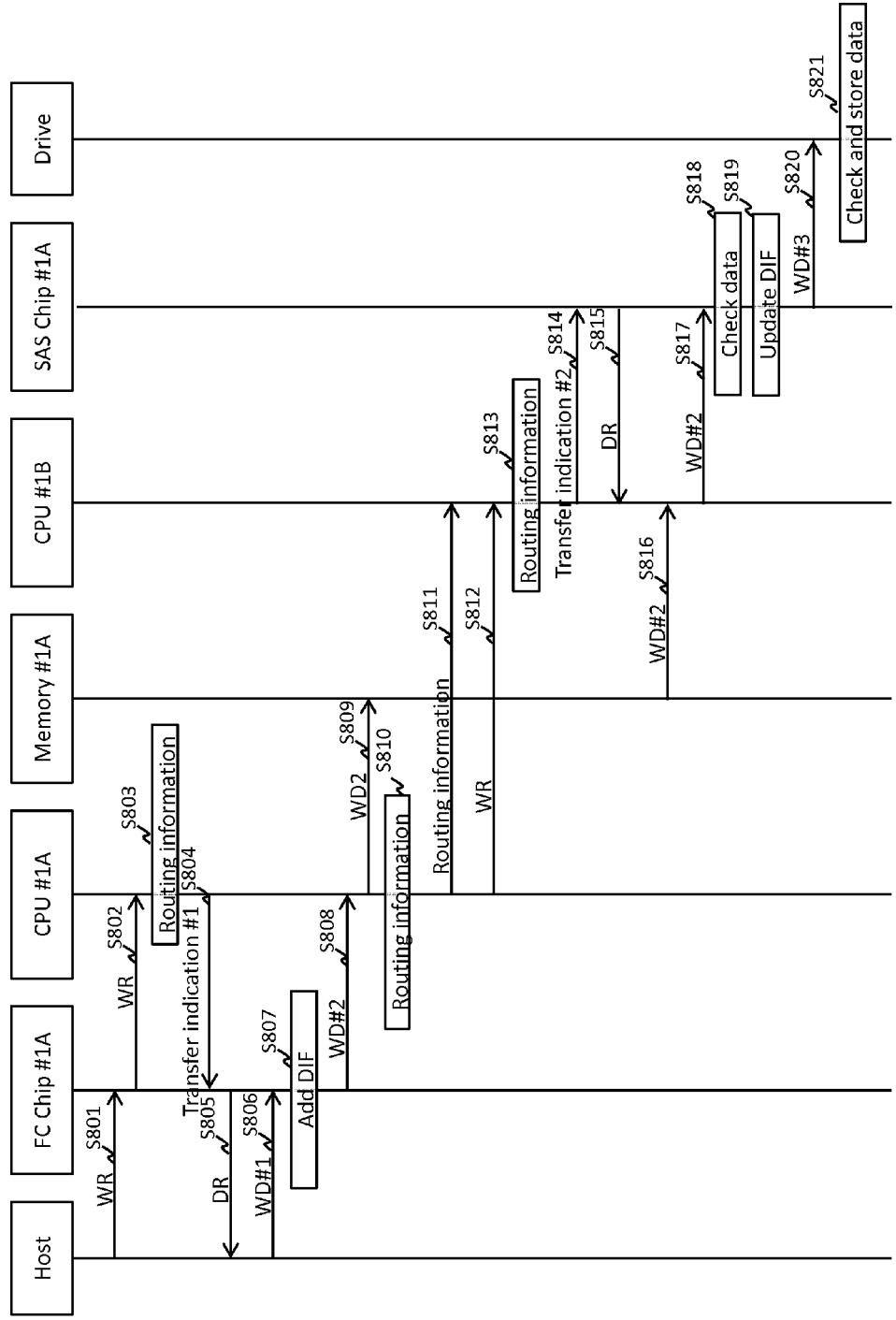
FIG. 8 shows a flowchart of a first write process.
Figure 10:
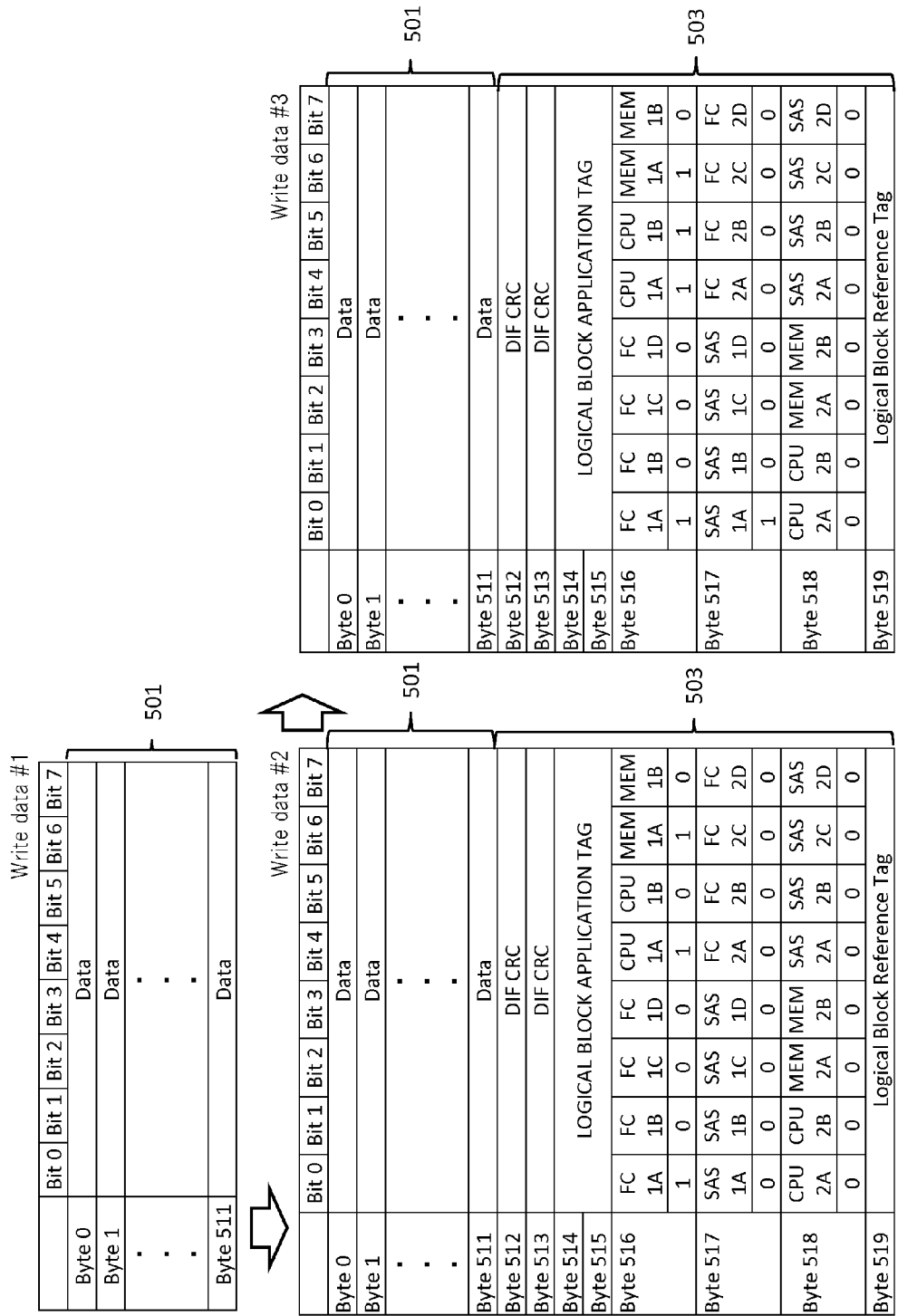
FIG. 10 shows the flow of write data in the first write process.

FIG. 8 shows a flowchart of a first write process.

The first write process is a process in which write data based on a write request from the host 2 is written in the drive 31 via one cluster 10 out of two clusters 10. Although a transfer route (data transfer route from the host 2 to the drive 31) in the first write process in this example below is a transfer route via an FC chip #1A, the CPU #1A, a memory #1A, the CPU #1B, and the SAS chip #1A, this is not limiting.

In step S801, the host 2 transmits, with respect to the storage system 100, a write request (WR) designating a logical unit number (LUN) and a logical block address (LBA) of an LU of a write destination. The FC chip #1A receives the write request.

In step S802, the FC chip #1A calculates the CPU #1A of a transfer destination based on the write request (WR) from the host 2. The FC chip #1A transfers the write request with respect to the CPU #1A. The CPU #1A receives the write request.

In step S803, the CPU #1A creates the routing information 610 based on the received write request (WR). Specifically, for example, the CPU #1A calculates, from the write request, the memory #1A of a storage destination of write data attached to the write request. The CPU #1A updates the value of a bit corresponding to the FC chip #1A of a transmission source of the write request, the value of a bit corresponding to itself (CPU #1A), and the value of a bit corresponding to the memory #1A in the routing information 610 respectively to "1."

In step S804, the CPU #1A creates a data transfer indication (hereinafter, transfer indication) #1 and transmits the transfer indication #1 to the FC chip #1A. The FC chip #1A receives the transfer indication #1. In the transfer indication #1, the routing information 610 is embedded. One example of the transfer indication #1 is shown in FIG. 9a. The transfer indication #1 is a command indicating transfer of write data based on the write request received in S802. Specifically, for example, the transfer indication #1 stores a command indicating a write, an address of a transfer source of write data, an address of a transfer destination of write data, and a transfer length of write data and is added with a part or all of the DIF code 503. In the added DIF code 503, the routing information 610 created in S803 is embedded. The FC chip #1A temporarily stores the transfer indication #1 in a memory, not shown, of itself.

In step S805, the FC chip #1A transmits a data request (DR) for write data to the host 2 in response to the transfer indication #1. The host 2 receives the data request.

In step S806, the host 2 transmits write data (write data #1) based on the data request (DR) to the FC chip #1A. The FC chip #1A receives the write data #1. The write data #1 transmitted from the host 2 is data of only the block data 501.

In step S807, the FC chip #1A updates write data. In other words, the FC chip #1A creates write data #2 from the write data #1. Specifically, for example, the write data #2 is data in which the DIF code 503 is added to the write data #1 based on the format 500 for DIF. The DIF code 503 is, for example, the DIF code 503 added to the transfer indication #1 received in S804.

In step S808, the FC chip #1A transmits the write data #2 to the CPU #1A based on the calculation result from the write request in S802. The CPU #1A receives the write data #2.

In step S809, the CPU #1A stores the write data #2 in the memory #1A based on the calculation result from the write request in S802.

In step S810, the CPU #1A updates the routing information 610 within the write data #2. Specifically, for example, the CPU #1A updates the value of a bit corresponding to the CPU #1B to "1" in the routing information 610. In this example, the CPU #1A is specified as the CPU 12 that receives a write request and write data from the host 2 via the FC chip 11 and the CPU #1B as the CPU 12 that writes write data in the drive 31 via the SAS chip 13, for example. Therefore, the CPU #1A updates the value of a bit corresponding to the CPU #1B in the routing information 610 to "1." The respective roles of the CPUs #1A and #1B may be specified in any way, and one CPU 12 may have all roles.

In step S811, the CPU #1A transmits the routing information 610 updated in S810 to the CPU #1B. The CPU #1B receives the routing information 610.

In step S812, the CPU #1A transfers the write request (WR) received in S802 to the CPU #1B. The CPU #1B receives the write request.

In step S813, the CPU #1B updates the routing information 610 received in S811. Specifically, for example, the CPU #1B calculates, based on the write request, the SAS chip #1A of a transmission destination of write data and a physical storage area of the drive 31 in which write data is to be stored. The CPU #1B updates the value of a bit corresponding to the SAS chip #1A in the routing information 610 to "1."

In step S814, the CPU #1B creates a transfer indication #2 and transmits the transfer indication #2 to the SAS chip #1A. The SAS chip #1A receives the transfer indication #2. The transfer indication #2 is a command indicating transfer of write data based on the write request (WR) received in S812. One example of the transfer indication #2 is shown in FIG. 9b. Specifically, for example, the transfer indication #2 stores a command indicating a write of write data, an address of a transfer source of write data, an address of a transfer destination of write data, and a transfer length of write data and is added with the DIF code 503, in a similar manner to the transfer indication #1. In a part of the DIF code 503 of the transfer indication #2, the routing information 610 updated in S813 is embedded. The SAS chip #1A temporarily stores the transfer indication #2 in a memory, not shown, of itself.

In step S815, the SAS chip #1A transmits a data request DR) for write data to the CPU #1B in response to the transfer indication #2. The CPU #1B receives the data request.

In step S816, the CPU #1B acquires the write data #2 from the memory #1A based on the data request (DR) of S815.

In step S817, the CPU #1B transmits the write data #2 to the SAS chip #1A of a transmission source of the data request (DR). The SAS chip #2 receives the write data #2.

In step S818, the SAS chip #1A checks for an error in the block data 501 within the write data #2 based on a DIF CRC within the received write data #2. In the case where an error in the block data 501 is detected at this time, the SAS chip #1A notifies the error with respect to the CPU #1A (and/or #1B). An error notification may be stored in the memory 13.

In step S819, the SAS chip #1A updates write data. In other words, the SAS chip #1A creates write data #3 from the write data #2. Specifically, for example, the write data #3 is data in which the DIF code 503 added to the write data #2 is updated. The SAS chip #1A updates the routing information 610 by updating the value of a bit corresponding to itself (SAS chip #1A) in the routing information 610 of the write data #2 to "1."

In step S820, the SAS chip #1A transmits the write data #3 to the drive ("target drive" in the description below for FIG. 8) 31 of a data storage destination. The target drive 31 receives the write data #3.

In step S821, the target drive 31 stores the write data #3 in a physical storage area of itself. At this time, a drive controller, not shown, of the target drive 31 may perform an error check of the block data 501 within the write data #3 based on a DIF CRC.

In the process described above, the DIF code 503 including a DIF CRC is added to write data (write data of only the block data 501 that has been described as the write data #1 in this example) received from the host 2, and write data and the DIF code 503 added thereto flow in a transfer route within the storage control apparatus 1. In write data (i.e., write data #2 and #3 in this example) added with the DIF code 503, the routing information 610 that is information of a transfer route is embedded in the DIF code 503. When an error in the block data 501 is detected by a check using a DIF CRC within the DIF code 503, a transfer route of the write data is identified from the routing information 610 within the DIF code 503. Each physical device included in a transfer route is a candidate for error cause. That is, a candidate for a physical device that has led write data to an error can be identified. In the process described above, not only a physical device included in the storage control apparatus 1 but also the drive 31 may be included as a physical device included in a transfer route. Therefore, the storage control apparatus 1 is capable of detecting not only a fault inside itself but also a fault in the drive 31.

In the process described above, a transfer indication including the routing information 610 is created by the CPU 12, and addition of the DIF code 503 including the routing information 610 to the block data 501 and an error check of the block data 501 are performed by the FC chip 11 or SAS chip 13 as a front-end or back-end communication interface. By the FC chip 11 or SAS chip 13 performing addition of the DIF code 503 including the routing information 610 to block data and an error check of data in this manner, the load of the CPU 12 can be reduced.

In the process described above, the drive 31 stores the write data #3 including the DIF code 503 including the routing information 610. With the write data #3, it is possible to identify all physical devices included in a transfer route at the time of the first write process. Therefore, all physical devices included in a transfer route at the time of a write process can be identified also upon reading the data (write data #3).

In the process described above, two CPUs 12 within one cluster 10 are used in data transfer based on the write request. Specifically, the CPU #1A that receives write data from the host 2 via the FC chip #1A and the CPU #1B that writes the write data in the drive 31 via the SAS chip #1A are used. By separating roles of the two CPUs 12 in this manner, parallel processing is made possible as described above, and prompt processing can be performed. Even if a fault has occurred in one of the CPUs 12, the other CPU 12 can continue processing. Therefore, redundancy can be maintained, and the CPU 12 with a fault can be identified.

Figure 11:
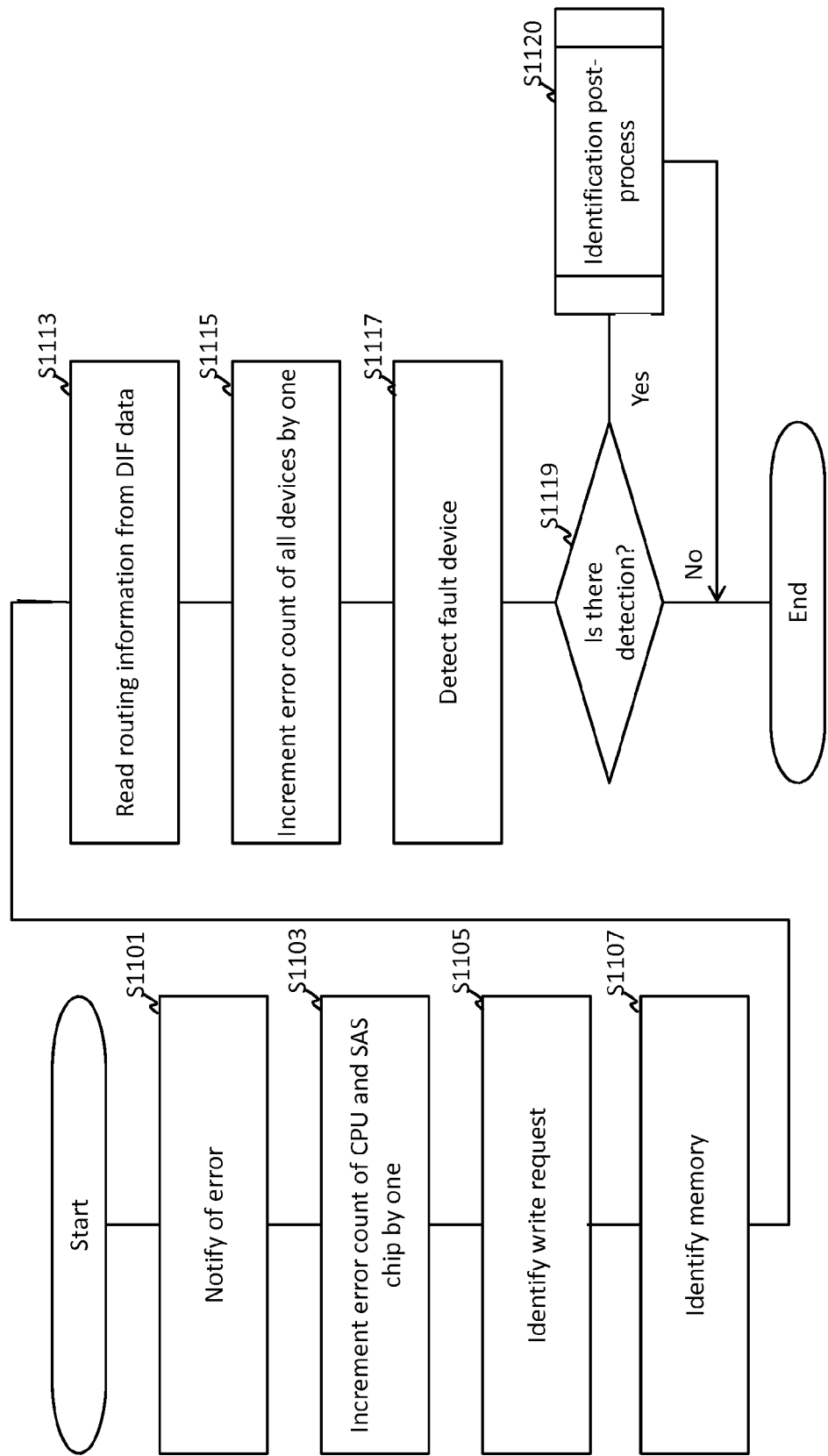
FIG. 11 is a flowchart of an error detection process at the time of a write process.

FIG. 11 is a flowchart of an error detection process at the time of a write process.

In the case where an error in the block data 501 included in write data is detected and it is notified by the SAS chip 14 to the CPU 12 that an error has been detected in S818 of the first write process, the error detection process is executed by the CPU 12 of a notification destination thereof or the CPU 12 to which the process has been requested by that CPU 12. The process is a process of detecting a physical device present in a transfer route of write data with an error in the block data 501.

In step S1101, the CPU 12 receives the error notification from the SAS chip 13 that has detected an error. Specifically, for example, the error notification is stored in the memory 13 by the SAS chip 13 (see S818), and the CPU 12 acquires the error notification from the memory 13. The memory 13 storing the error notification may be either one of memories #1A and #1B.

In step S1103, the CPU 12 updates the error count table 200. Specifically, for example, the CPU 12 increments the error count 203 of the error count table 200 by one for the SAS chip 13 of a notification source of the error and itself (CPU 12).

In step S1105, the CPU 12 identifies the write request corresponding to write data in which the error has been detected. Specifically, for example, the CPU 12 identifies the write request based on information included in the error notification acquired in S1101.

In step S1107, the CPU 12 identifies the memory 13 storing write data (write data #2 in the example of FIG. 8) based on the write request identified in S1105. Specifically, for example, the CPU 12 calculates an address of the memory 13 storing write data from the write request and identifies the memory 13 based on the calculation result.

In step S1113, the CPU 12 acquires the routing information 610 of the identified write data from the memory 13. Specifically, for example, the CPU 12 acquires the routing information 610 added to the write data identified in S1105 that is stored in the memory 13 identified in S1107.

In step S1115, the CPU 12 updates the error count table 200. Specifically, for example, the CPU 12 increments the error count 203 of the error count table 200 by one for all physical devices for which the bit is 1 in the routing information (routing information added to write data) 610 acquired in S1113.

In step S1117, the CPU 12 detects a fault device. Specifically, for example, the CPU 12 detects the type 201 (301) and the ID 202 (302) of a physical device for which the error count 203 exceeds the threshold, based on the threshold table 300 and the error count table 200.

In step S1119, the CPU 12 determines whether or not a fault device has been detected in S1117. In the case where the result of determination is true (Yes in S1119), the CPU 12 proceeds to a process in step S1120, executes a fault device identification post-process, and terminates the process. On the other hand, in the case where the result of determination is false (No in S1119), the CPU 12 terminates the process.

In the process described above, the error count 203 of the error count table 200 is incremented for all physical devices present in a transfer route of write data in which a data error has been detected. Accordingly, the error count for each physical device can be obtained. Based on the error count table 200 and the threshold table 300, a physical device for which the error count 203 exceeds the threshold 303 configured in advance is detected. Accordingly, not all physical devices present in a transfer route of write data in which an error has been detected but a physical device with a high probability of error detection, i.e., physical device that is likely a fault device, can be identified.

Although a fault device is detected based on the threshold table 300 and the error count table 200 in S1117 in the process described above, this is not limiting. For example, the CPU 12 may calculate a mean value or median value of error counts for all physical devices and detect, as a fault device, a physical device for which the error count exceeds the mean value or median value.

FIG. 12 is a flowchart of the fault device identification post-process.

The fault device identification post-process is a process executed in S1120 of the error detection process to isolate a fault device from the storage system 100.

In S1201, the CPU 12 isolates the fault device from the storage system 100. Specifically, the CPU 12 controls the fault device (physical device in which a fault has been detected in the error detection process) to be not included in a transfer route in a data transfer process thereafter. Specifically, for example, the CPU 12 refers to the fault device table 400 and identifies the replacement portion 403 from the type 401 and the ID 402 of the physical device detected in the error detection process. By assuming the state of the identified physical device (replacement portion 403) as a fault, the physical device is caused to be not included in a transfer route thereafter. For example, in the case where the CPU #1A is the fault device, it may be such that the CPU #1A is not included in a transfer route and the CPU #1B fulfills the function of the CPU #1A.

In S1203, the CPU 12 notifies of the fault device with respect to a user (or administrator using a management computer, not shown, of the storage system 100) of the host 2. Specifically, for example, the CPU 12 refers to the fault device table 400, generates information with which the fault device within the storage system 100 is identified, and transmits the information to be displayed by the host 2 (or the management computer, not shown). The information is a device list representing all physical devices and states thereof within the storage system 100, for example. One example of the displayed device list is shown in FIG. 13. According to the device list, the state of an FC chip #2A (FC 2A) that is the fault device is "abnormal."

With the process described above, a fault device can be isolated from the storage system 100, and a fault device can be notified to a user.

Figure 17:
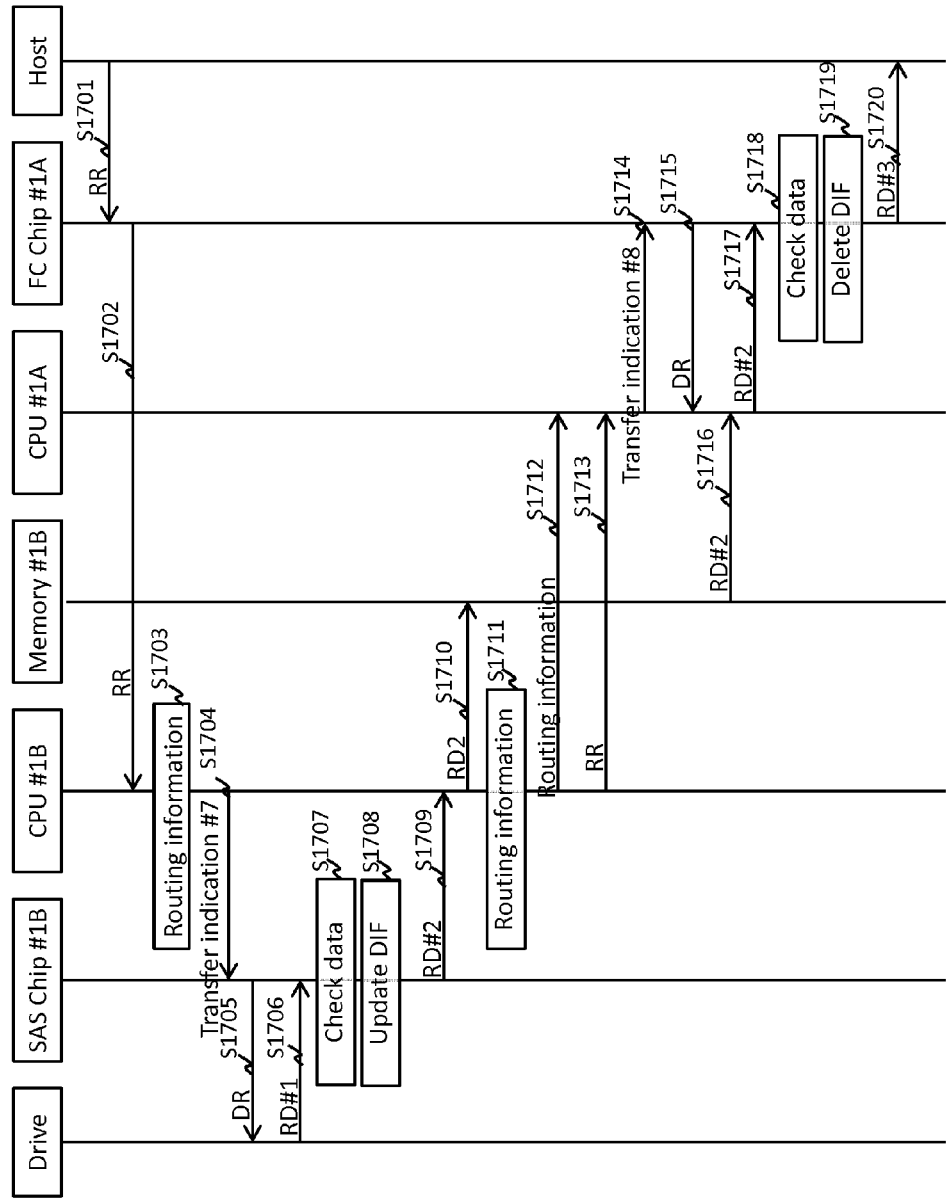
FIG. 17 shows a flowchart of a first read process.

FIG. 17 shows a flowchart of a first read process.

The first read process is a process in which read data based on a read request is read from the drive 31 and transmitted to the host 2 via one cluster 10 out of two clusters, in the case where the storage system 100 has received a read request from the host 2. Although a transfer route (transfer route from the host 2 to the drive 31) in the first read process of this example below is a transfer route via an FC chip #1A, the CPU #1A, the memory #1B, the CPU #1B, and an SAS chip #1B of the cluster #1, this is not limiting.

In step S1701, the host 2 transmits, with respect to the storage system 100, a read request (RR) designating an LUN and an LBA of an LU of a read destination. The FC chip #1A receives the read request.

In step S1702, the FC chip #1A calculates the CPU #1B of a transfer destination based on the received read request. The FC chip #1A transfers the read request to the CPU #1B. The CPU #1B receives the read request.

In step S1703, the CPU #1B creates the routing information 610 based on the received read request. Specifically, for example, the CPU #1B calculates, from the read request, the drive 31 ("target drive" in the description of FIG. 17 below) of a storage destination of read data, the SAS chip 14 for accessing the target drive 31, and an address of the memory ("target memory" in the description of FIG. 17 below) 12 that temporarily stores read data read from the target drive 31. The CPU #1B updates each value of a bit corresponding to a physical device (i.e., the SAS chip #1B, the CPU #1B, and the memory #1B) belonging to a route from the target drive 31 to the target memory 12 in the routing information 610 to "1."

In step S1704, the CPU #1B creates a transfer indication #7 and transmits the transfer indication #7 to the SAS chip #1A. The SAS chip #1A receives the transfer indication #7. The transfer indication #7 is a command indicating transfer of read data based on the read request received in S1702. One example of the transfer indication #7 is shown in FIG. 18*a*. Specifically, for example, the transfer indication #7 stores a command indicating a read, an address of a transfer source of read data, an address of a transfer destination of read data, and a transfer length of read data and is added with the DIF code 503. In a part of the added DIF code 503, the routing information 610 created in S1703 is embedded. The FC chip #1A temporarily stores the transfer indication #1 in a memory, not shown, of itself.

In step S1705, the SAS chip #1B transmits a data request (DR) for read data to the target drive 31 in response to the transfer indication #7. The target drive 31 receives the data request.

In step S1706, the target drive 31 transmits read data (read data #1) based on the data request to the SAS chip #1B. The SAS chip #1B receives the read data #1. As shown in FIG. 19, the read data #1 is stored in a physical storage area of the target drive 31 in a state where the DIF code 503 embedded in the routing information 610 is added to the block data 501. Specifically, for example, information showing all physical devices included in a transfer route at the time of a write process is stored in the routing information 610 of the read data #1. (For example, the read data #1 is data similar to the write data #3 in the first write process.)

In step S1707, the SAS chip #1B checks for an error in the block data 501 within the read data #1 based on a DIF CRC within the received read data #1. In the case where an error in the block data 501 is detected, the SAS chip #1B notifies the error with respect to the CPU 12. The CPU 12 to which the error is notified may be either one of the CPUs #1A and #1B. An error notification may be stored in the memory 13.

In step S1708, the SAS chip #1B updates the read data #1. In other words, the SAS chip #1B creates read data #2 from the read data #1. Specifically, for example, the read data #2 is data in which the routing information 610 of the DIF code 503 added to the read data #1 is updated, as shown in FIG. 19. In the routing information 610 within the read data #2 in an example in FIG. 19, the value of a bit corresponding to a physical device (the SAS chip #1A, the CPU #1A, the memory #1A, the CPU #1B, and the FC chip #1A) included in the routing information 610 of the read data #1 and the value of a bit corresponding to a physical device (the SAS chip #1B, the CPU #1B, and the memory #1B) included in the routing information 610 within the transfer indication #7 received in S1704 are respectively "1."

In step S1709, the SAS chip #1B transmits the read data #2 to the CPU #1B based on the routing information 610 included in the read data #2. The CPU #1B receives the read data #2.

In step S1710, the CPU #1B stores the read data #2 in the memory #1B based on the routing information 610 included in the read data #2.

In step S1711, the CPU #1B updates the routing information 610. Specifically, for example, the CPU #1B updates the value of a bit corresponding to the CPU #1A to "1" in the routing information 610. In this example, the CPU #1B is specified as the CPU 12 that reads read data into the memory #1B from the drive 31 via the SAS chip 13 and the CPU #1A as the CPU 12 with which read data is read from the memory #1B and transmitted to the host 2 via the FC chip 11 in the first read process, for example. Therefore, the CPU #1B updates the value of a bit corresponding to the CPU #1A in the routing information 610 to "1." The respective roles of the CPUs #1A and #1B may be specified in any way, and one CPU 12 may have all roles.

In step S1712, the CPU #1B transmits the routing information 610 updated in S1711 to the CPU #1A. The CPU #1A receives the routing information 610.

In step S1713, the CPU #1B transfers the read request (RR) received in S1702 to the CPU #1A. The CPU #1A receives the read request.

Figure 18B:
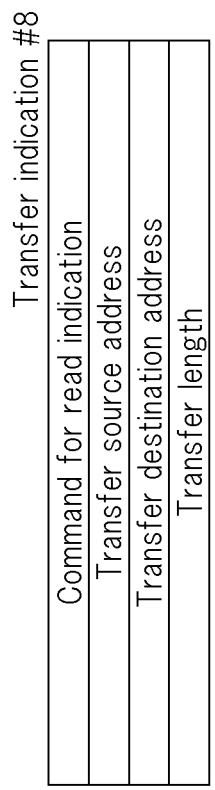
FIG. 18b shows one example of a transfer indication #8.

In step S1714, the CPU #1A creates a transfer indication #8 and transmits the transfer indication #8 to the FC chip #1A. The FC chip #1A receives the transfer indication #8. The transfer indication #8 is a command indicating transfer of read data based on the read request (RR) received in S1713. One example of the transfer indication #8 is shown in FIG. 18*b*. The transfer indication #8 is not added with the DIF code 503 including the routing information 610 and includes only a command indicating a read, an address of a transfer source and transfer destination of read data, and a transfer length, for example.

In step S1715, the FC chip #1A transmits a data request (DR) for read data to the CPU #1A in response to the transfer indication #8. The CPU #1A receives the data request.

In step S1716, the CPU #1A acquires the read data #2 from the memory #1A based on the data request (DR).

In step S1717, the CPU #1A transmits the read data #2 to the FC chip #1A of a transmission source of the data request (DR). The FC chip #1A receives the read data #2.

In step S1718, the FC chip #1A checks for an error in the block data 501 within the read data #2 based on a DIF CRC within the received read data #2. In the case where an error in the block data 501 is detected at this time, the FC chip #1A notifies the error with respect to the CPU 12. The CPU 12 to which the error is notified may be either one of the CPUs #1A and #1B. An error notification may be stored in the memory 13.

In step S1719, the FC chip #1A updates read data. In other words, the FC chip #1A creates read data #3 from the read data #2. Specifically, for example, the read data #3 is data in which the DIF code 503 is deleted from the read data #2 (i.e., data of only the block data 501), as shown in FIG. 19.

In step S1720, the SAS chip #1A transmits the read data #3 to the host 2.

In the process described above, the DIF code 503 including a DIF CRC is added to the block data 501 in read data transferred within the storage control apparatus 1. In read data (read data #2 and #3 in this example), the routing information 610 that is information of a transfer route is embedded in the DIF code 503. When an error in the block data 501 is detected by a check using a DIF CRC within the DIF code 503, a transfer route of the read data is identified from the routing information 610 within the DIF code 503. Each device included in the transfer route is an error-cause candidate. That is, a candidate for a physical device that has led read data to a data error can be identified. In the process described above, not only a physical device included in the storage control apparatus 1 but also the drive 31 may be included as a physical device included in a transfer route.

Therefore, the storage control apparatus 1 is capable of detecting not only a fault inside itself but also a fault in the drive 31.

In the process described above, a transfer indication including the routing information 610 is created by the CPU 12, and addition of the DIF code 503 including the routing information 610 to block data and an error check of the block data 501 are performed by the FC chip 11 or SAS chip 14 as a front-end or back-end communication interface. By the FC chip 11 or SAS chip 14 performing addition of the DIF code 503 including the routing information 610 to block data and an error check of data in this manner, the load of the CPU 12 can be reduced.

In the process described above, the drive 31 stores data including the routing information 610 in which a physical device present in a transfer route at the time of a write process is recorded. Therefore, all physical devices included in a transfer route at the time of a write process can be identified also upon reading the data.

In the process described above, two CPUs 12 within one cluster 10 are used in data transfer based on the read request. Specifically, the CPU #1B that receives read data from the drive 31 via the SAS chip #1B and the CPU #1A that transmits the read data to the host 2 via the FC chip #1A are used. By separating roles of the two CPUs 12 in this manner, parallel processing is made possible as described above, and prompt processing can be performed. Even if a fault has occurred in one of the CPUs 12, the other CPU 12 can continue processing. Therefore, redundancy can be maintained, and the CPU 12 with a fault can be identified.

Creation of the routing information 610 is performed by the CPU #1B in the process described above, but may be performed by the CPU #1A. In this case, the CPU #1B transmits only the read request to the CPU #1A after storing the read data #2 in the memory #1B in S1710, without executing S1711 and 1712, for example. It may be such that the CPU #1A receives the read request and updates the value of a bit corresponding to itself (CPU #1A) in the routing information 610 to "1." Accordingly, a creation (update) process for the routing information 610 performed by the CPU 12 can be decentralized, and the load of the CPU #1B is reduced.

Figure 20:
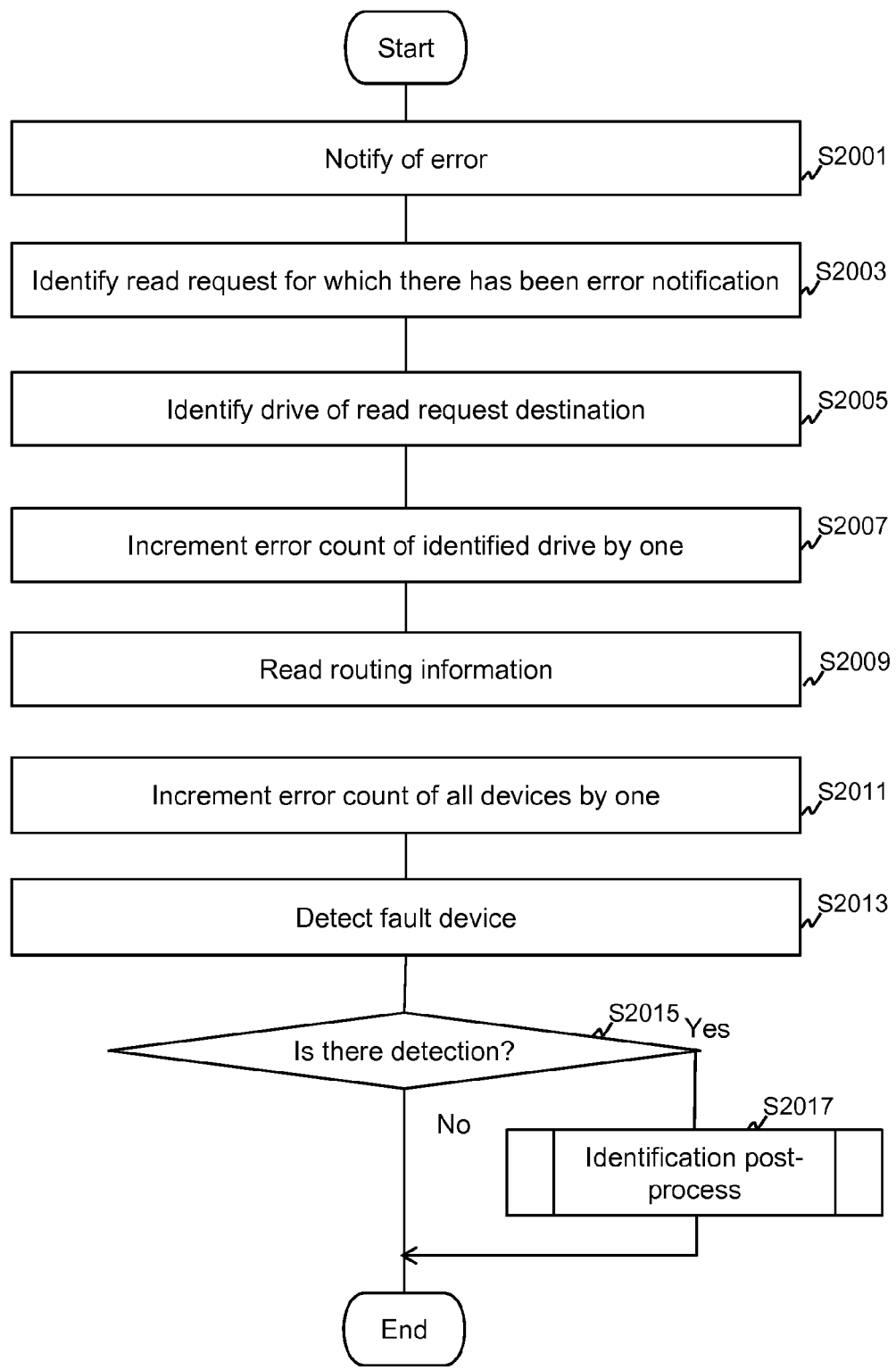
FIG. 20 is a flowchart of an error detection process by a SAS chip 14 at the time of a read process.

FIG. 20 is a flowchart of an error detection process by the SAS chip 14 at the time of a read process.

The error detection process is executed in the case where the error notification is received by the CPU 12 from the SAS chip 12 that has detected an error in the block data 501 included in read data in S1707 of the first read process. The process is a process of detecting a physical device present in a transfer route of read data with an error in the block data 501.

In step S2001, the CPU 12 receives the error notification from the SAS chip 13 that has detected an error. Specifically, for example, the error notification is stored in the memory 13 by the SAS chip 13 (see S1707 in FIG. 17), and the CPU 12 acquires the error notification from the memory 13. The memory 13 storing the error notification may be the memory 13 as either one of the memories #1A and #1B. Although the CPU 12 that acquires the error notification from the memory 12 is the CPU 12 that has received the read data #2 from the SAS chip 14 in this example, this is not limiting.

In step S2003, the CPU 12 identifies the read request that is a basis for read data in which a data error has occurred. Specifically, for example, the CPU 12 identifies the read request based on information included in the error notification acquired in S2001.

In step S2005, the CPU 12 identifies the ID 202 of the drive 31 storing target read data based on the identified read request.

In step S2007, the CPU 12 updates the error count table 200. Specifically, for example, the CPU 12 increments the error count 203 of the error count table 200 by one for the identified drive (type 201 and ID 202).

In step S2009, the CPU 12 acquires the routing information 610 of target read data from the memory 13. Specifically, for example, the CPU 12 acquires the routing information 610 added to the read data #2 from the memory 13 storing the read data #2.

In step S2011, the CPU 12 updates the error count table 200. Specifically, for example, the CPU 12 increments the error count 203 of the error count table 200 by one for all physical devices for which the bit is 1 based on the routing information 610 acquired in S2009.

In step S2013, the CPU 12 detects a fault device. Specifically, for example, the CPU 12 detects a physical device for which the error count 203 exceeds the threshold 303, based on the threshold table 300 and the error count table 200.

In step S2015, the CPU 12 determines whether or not a fault device has been detected in S2013. In the case where the result of determination is true (Yes in S2015), the CPU 12 proceeds to a process in step S2017, executes the fault device identification post-process, and terminates the process. In the case where the result of determination is false (No in S2015), the CPU 12 terminates the process. The fault device identification post-process is as described above (see FIG. 12).

In the process described above, the error count 203 of the error count table 200 is incremented for all physical devices present in a transfer route of read data in which an error has been detected. Based on the threshold table 300, a physical device for which a threshold configured in advance is exceeded is detected. Accordingly, not all devices present in a transfer route of read data in which a data error has been detected but a physical device with a high probability of data error detection can be identified.

In the process described above, an error in the block data 501 of data (read data #1 herein) read into the SAS chip 14 from the drive 31 is detected. The data is added with the routing information 610 at the time of writing of data. That is, the read data #1 is similar to the write data #3. Therefore, in the case where an error in the block data 501 is detected, all physical devices included in a transfer route of write data at the time of a write process can be assumed a candidate for a fault device.

Although a fault device is detected based on the threshold table 300 and the error count table 200 in S2013 in the process described above, this is not limiting. For example, the CPU 12 may calculate a mean value or median value of error counts for all physical devices and detect, as a fault device, a physical device for which the error count exceeds the mean value or median value.

Figure 21:
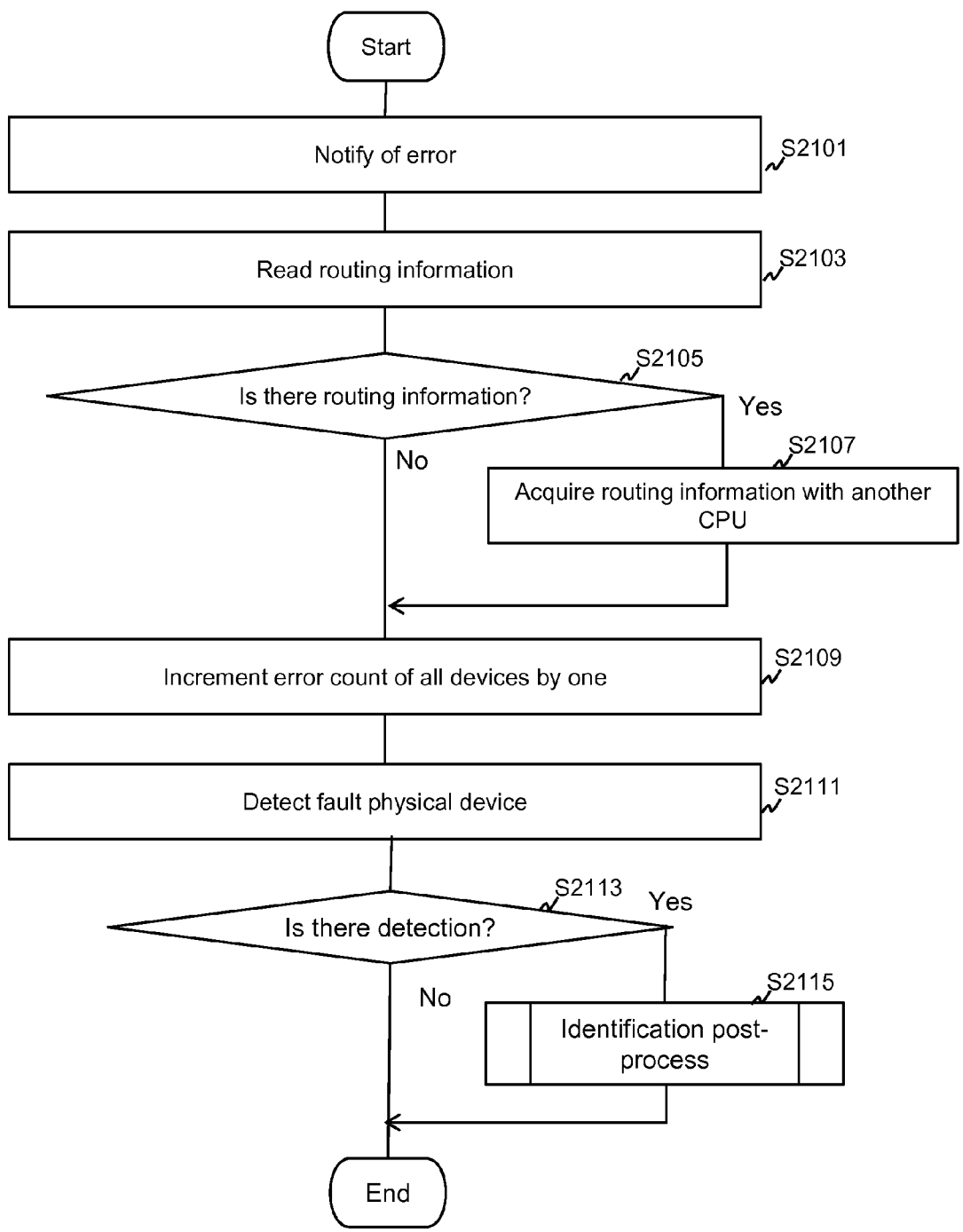
FIG. 21 is a flowchart of an error detection process by an FC chip 11 at the time of a read process.

FIG. 21 is a flowchart of an error detection process by the FC chip 11 at the time of a read process.

The error detection process is executed in the case where the error notification is received by the CPU 12 from the FC chip 11 that has detected an error in the block data 501 included in read data in S1718 of the first read process. The process is a process of detecting a physical device present in a transfer route of read data with an error in the block data 501.

In step S2101, the CPU 12 receives the error notification from the FC chip 11 that has detected an error. Specifically, for example, the error notification is stored in the memory 13 by the FC chip (see S1718 in FIG. 17), and the CPU 12 acquires the error notification from the memory 13. The memory 13 storing the error notification may be the memory 13 as either one of the memories #1A and #1B.

In step S2103, the CPU 12 identifies the memory 13 storing read data (read data #2 in the example of FIG. 17) based on the received error notification and reads the read data from the memory 13 to acquire the routing information 610.

In step S2105, the CPU 12 determines whether or not the routing information 610 has been acquired in S2103. In the case where the result of determination is true (Yes in S2105), the CPU 12 proceeds to a process in S2107. In the case where the result of determination is false (No in S2105), the CPU 12 proceeds to a process in S2109.

In step S2107, the CPU 12 causes another CPU to acquire the routing information 610. This is a process in the case where the CPU 12 that has received the error notification has not been able to acquire the routing information 610, for example. For example, in the case where another CPU 12 has a role of reading the read data #2, this process is performed. At this time, the CPU 12 may transfer the error notification to another CPU 12.

In step S2109, the CPU 12 updates the error count table 200. Specifically, for example, the CPU 12 increments the error count 203 of the error count table 200 by one for all physical devices for which the bit is 1 based on the acquired routing information 610.

In step S2111, the CPU 12 detects a fault device. Specifically, for example, the CPU 12 detects a physical device for which the error count 203 exceeds a threshold, based on the threshold table 300 and the error count table 200.

In step S2113, the CPU 12 determines whether or not a fault device has been detected in S2211. In the case where the result of determination is true (Yes in S2113), the CPU 12 proceeds to a process in step S2115, executes the fault device identification post-process, and terminates the process. In the case where the result of determination is false (No in S2113), the CPU 12 terminates the process. The fault device identification post-process is as described above (see FIG. 12).

In the process described above, the error count 203 of the error count table 200 is incremented for all physical devices present in a transfer route of read data in which a data error has been detected. Based on the threshold table 300, a physical device for which a threshold configured in advance is exceeded is detected. Accordingly, not all devices present in a transfer route of read data in which a data error has been detected but a physical device with a high probability of data error detection can be identified.

In the process described above, error detection is done for the block data 501 included in read data by the FC chip 14. In the case where an error is detected, all physical devices included in a transfer route of read data can be assumed a candidate for a fault device.

Although a fault device is detected based on the threshold table 300 and the error count table 200 in S2113 in the process described above, this is not limiting. For example, a mean value or median value of error counts for all physical devices may be calculated, and a physical device for which the error count exceeds the mean value or median value may be detected as a fault device.

Next, a write process and a read process in the case where data takes a route via two cluster 10 within the storage control apparatus 1 will be described as a modified example of this example.

Figure 14:
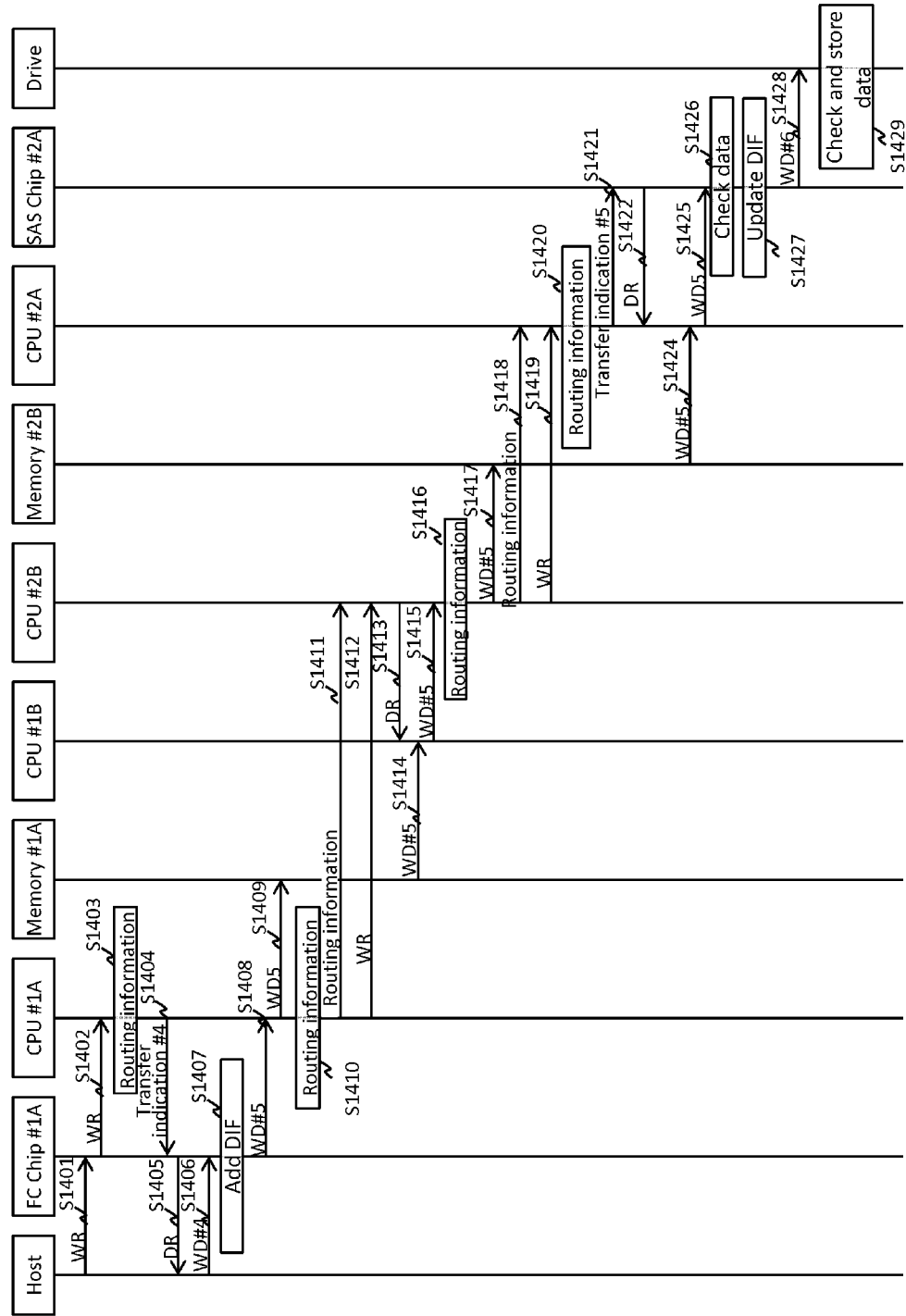
FIG. 14 shows a flowchart of a second write process.

FIG. 14 shows a flowchart of a second write process.

The second write process is a process in which write data based on a write request from the host 2 is written in the drive 31 via two clusters 10. Although a transfer route (transfer route from the host 2 to the drive 31) in the second write process of this example below is a transfer route via the FC chip #1A, the CPU #1A, the memory #1A, the CPU #1B, the CPU #2B, a memory #2B, the CPU #2A, and the SAS chip #1A, this is not limiting.

In step S1401, the host 2 transmits, with respect to the storage system 100, a write request designating an LUN and an LBA of an LU of a write destination. The FC chip #1A receives the write request.

In step S1402, the FC chip #1A calculates the CPU #1A of a transfer destination based on the write request from the host 2. The FC chip #1A transfers the write request with respect to the CPU #1A. The CPU #1A receives the write request.

In step S1403, the CPU #1A creates the routing information 610 based on the received write request (WR). Specifically, for example, the CPU #1A calculates, from the write request, the memory #1A of a storage destination for write data attached to the write request. The CPU #1A updates the value of a bit corresponding to the FC chip #1A of a transmission source of the write request, the value of a bit corresponding to itself (CPU #1A), and the value of a bibit corresponding to the memory #1A in the routing information 610 respectively to "1."

In step S1404, the CPU #1A creates a transfer indication #4 and transmits the transfer indication #4 to the FC chip #1A. The FC chip #1A receives the transfer indication #4. The transfer indication #4 is a command indicating transfer of write data based on the write request received in S1402. One example of the transfer indication #4 is shown in FIG. 15a. Specifically, for example, the transfer indication #4 stores a command indicating a write, an address of a transfer source of write data, an address of a transfer destination of write data, and a transfer length of write data and is added with the DIF code 503. In a part of the added DIF code 503, the routing information 610 created in S1403 is embedded. The FC chip #1A temporarily stores the transfer indication #4 in a memory, not shown, of itself.

In step S1405, the FC chip #1A transmits a data request (DR) for write data to the host 2 in response to the transfer indication #4. The host 2 receives the data request.

Figure 16:
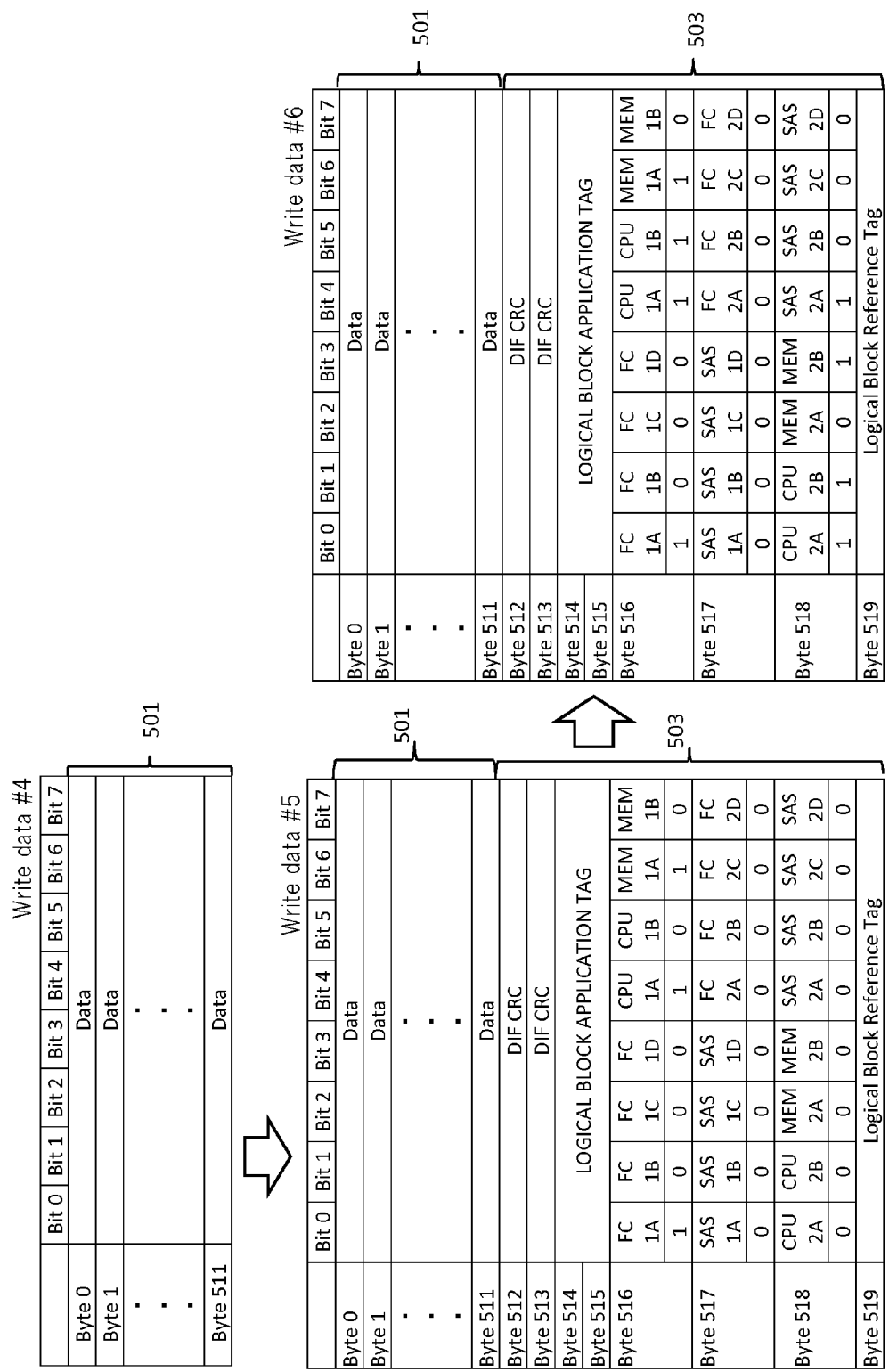
FIG. 16 shows the flow of write data in the second write process.

In step S1406, the host 2 transmits write data (write data #4) based on the data request to the FC chip #1A. The FC chip #1A receives the write data #4. The write data #4 transmitted from the host 2 is data of only the block data 501, as shown in FIG. 16.

In step S1407, the FC chip #1A updates write data. In other words, the FC chip #1A creates write data #5 from the write data #4. Specifically, for example, the write data #5 is data in which the DIF code 503 is added to the write data #4 based on the format 500 for DIF, as shown in FIG. 16. The DIF code 503 is, for example, the DIF code 503 added to the transfer indication #4 received in S1404.

In step S1408, the FC chip #1A transmits the write data #5 with respect to the CPU #1A based on the calculation result from the write request in S1402. The CPU #1A receives the write data #5.

In step S1409, the CPU #1A stores the write data #5 in the memory #1A based on the routing information 610 included in the write data #5.

In step S1410, the CPU #1A updates the routing information 610 within the write data #5. Specifically, for example, the CPU #1A updates the value of a bit corresponding to the CPU #1B to "1" in the routing information 610. In this example, the CPU #1A of the cluster 1 is specified as a CPU that receives a write request and write data from the host 2 via an FC chip, the CPU #1B as a CPU that transfers the write data to the cluster 2, the CPU #2B of the cluster 2 as a CPU that receives a write request and write data from the cluster 1, and the CPU #2A as a CPU that stores write data in the drive 31 via the SAS chip #2A, for example. Therefore, the CPU #1A updates the value of a bit corresponding to the CPU #1B in the routing information 610 to "1." The respective roles of a plurality of CPUs in each cluster may be specified in any way, and one CPU may have all roles for each cluster.

In step S1411, the CPU #1A transmits the routing information 610 updated in S1410 to the cluster 2. The CPU #2B receives the routing information 610.

In step S1412, the CPU #1A transfers the write request (WR) received in S1402 to the cluster 2. The CPU #2B receives the write request.

In step S1413, the CPU #2B transmits a data request (DR) to the cluster 1 based on the received write request. The CPU #1B receives the data request.

In step S1414, the CPU #1B acquires the write data #5 from the memory #1A based on the data request (DR) of S1413.

In step S1415, the CPU #1B transmits the write data #5 to the CPU #2B of a transmission source of the data request (DR). The CPU #2B receives the write data #5.

In step S1416, the CPU #2B updates the routing information 610. Specifically, for example, the CPU #2B updates the value of a bit corresponding to the memory #2B of a storage destination of the write data #5 in the routing information 610 to "1."

In step S1417, the CPU #2B stores the write data #5 in the memory #2B based on the write request (WR) received S1412.

In step S1418, the CPU #2B transmits the routing information 610 updated in S1415 to the CPU #2A that has a role of transmitting write data to the drive 31.

In step S1419, the CPU #2B transmits the write request (WR) to the CPU #2A. The CPU #2A receives the write request.

In step S1420, the CPU #2A updates the routing information 610. Specifically, for example, the CPU #2A updates a bit corresponding to itself (CPU #2A) to "1" in the routing information 610.

In step S1421, the CPU #2A creates a transfer indication #5 and transmits the transfer indication #5 to the SAS chip #2A. The SAS chip #2A receives the transfer indication #5. The transfer indication #5 is a command indicating transfer of write data based on the write request received in S1419. One example of the transfer indication #5 is shown in FIG. 15b. The transfer indication #5 stores a command indicating a write, an address of a transfer source of write data, an address of a transfer destination of write data, and a transfer length of write data and is added with the DIF code 503. In a part of the added DIF code 503, the routing information 610 updated in S1420 is embedded. The SAS chip #2A temporarily stores the transfer indication #5 in a memory, not shown, of itself.

In step S1422, the SAS chip #2A transmits a data request (DR) to the CPU #2A. The CPU #2A receives the data request.

In step S1424, the CPU #2A acquires the write data #5 from the memory #2B based on the data request (DR) of S1422.

In step S1425, the CPU #2A transmits the write data #5 to the SAS chip #2A based on the data request (DR). The SAS chip #2A receives the write data #5.

In step S1426, the SAS chip #2A checks for an error in the block data 501 within the write data #5 based on a DIF CRC within the received write data #5. In the case where an error in the block data 501 is detected at this time, the SAS chip #2A notifies the error with respect to the CPU 12. The CPU 12 to which the error is notified may be any CPU 12 in the cluster 1 or cluster 2. An error notification may be stored in any memory 13 in the cluster to which the error is notified.

In step S1427, the SAS chip #2A updates write data. In other words, the SAS chip #2A creates write data #6 from the write data #5. Specifically, for example, the write data #6 is data in which the routing information 610 of the write data #5 is updated, as shown in FIG. 16. The SAS chip #2A updates the routing information by updating the value of a bit corresponding to itself (SAS chip #2A) in the routing information 610 of the write data #6 to "1."

In step S1428, the SAS chip #2A transmits the write data #6 to the drive ("target drive" in the description below for FIG. 14) 31 of a data storage destination. The target drive 31 receives the write data #6.

In step S1429, the target drive 31 stores the write data #6 in a physical storage area of itself. At this time, a drive controller, not shown, of the target drive 31 may perform an error check of the block data 501 within the write data #6 based on a DIF CRC.

In the case where the error notification of data is made from the SAS chip #2A in S1426 in the process described above, the CPU 12 to which the notification is made executes the error detection process described above (see FIG. 11) and the fault device identification post-process (see FIG. 12).

The process described above basically has a similar effect to the first write process. In addition, a fault device can be identified even with the storage control apparatus 1 including two or more clusters 10 having redundancy.

In the process described above, two CPUs 12 in each of the two clusters have been used in transfer of write data based on the write request. Specifically, the CPU #1A that receives write data from the host 2 via the FC chip #1A, the CPU #1B and the CPU #2B that perform data transfer between clusters, and the CPU #1B that writes write data in the drive 31 via the SAS chip #1A have been used. By two CPUs 12 being provided to each one of the clusters 10 in this manner, parallel processing is made possible as described above, and prompt processing can be performed. Even if a fault has occurred in any of the CPUs 12, other CPUs 12 can continue processing. Therefore, redundancy can be maintained, and the CPU 12 with a fault can be identified.

Creation of the routing information 610 is performed by the CPU #1A in the process described above, but may be performed by the CPU #1B. In this case, the CPU #1A transmits only the read request to the CPU #1B after storing the read data #5 in the memory #1A in S1409, without executing S1410, 1411, and 1412, for example. It may be such that the CPU #1B receives the read request, updates the value of a bit corresponding to itself (CPU #1B) in the routing information 610 to "1," and transmits the routing information 610 after update and the write request to the CPU #2B. Accordingly, in the cluster #1, a creation (update) process for the routing information 610 performed by the CPU 12 can be decentralized, and the load of the CPU #1A is reduced.

Figure 22:
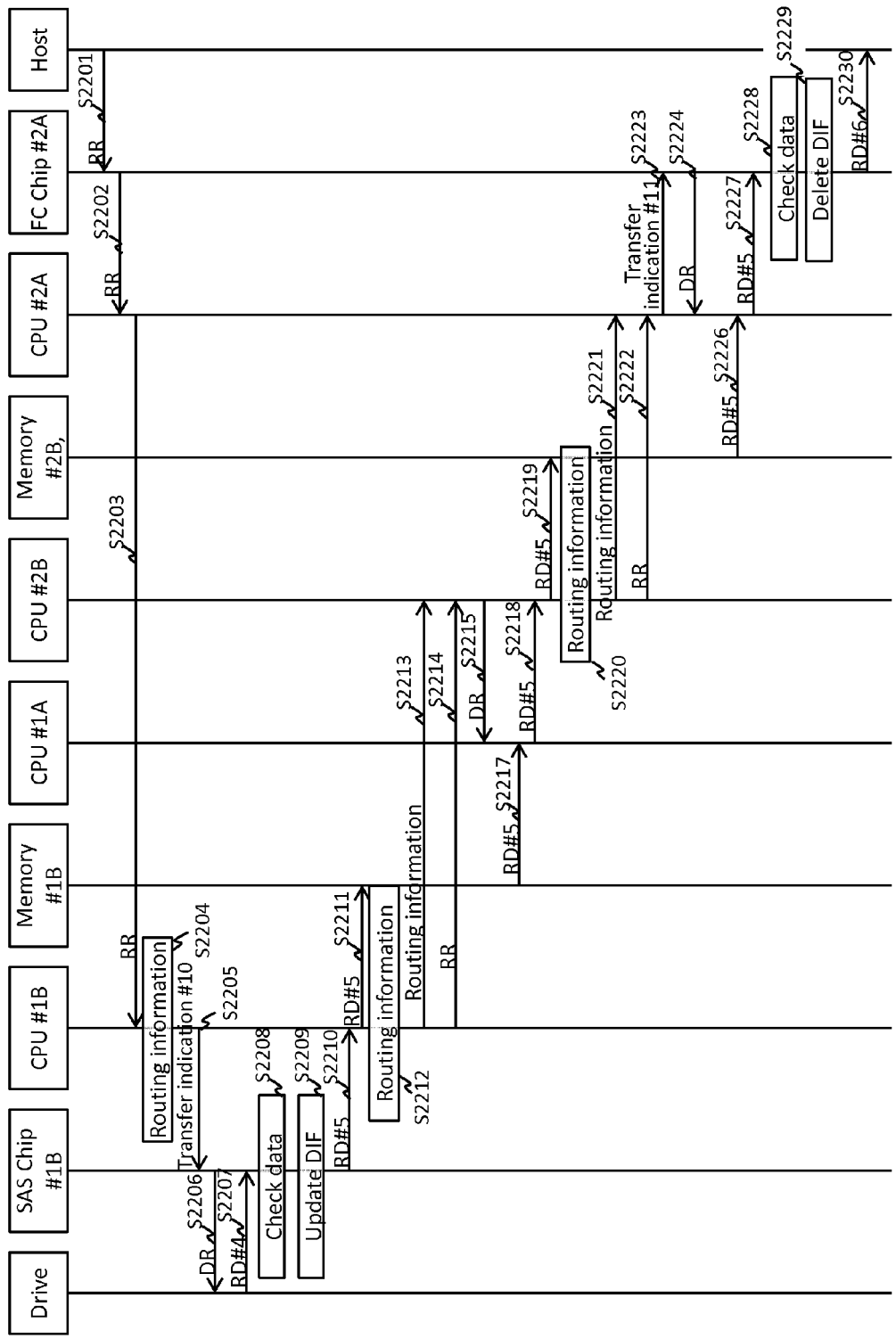
FIG. 22 shows a flowchart of a second read process.

FIG. 22 shows a flowchart of a second read process.

The second read process is a process in which read data based on a read request is read from the drive 31 and transmitted to the host 2 via two clusters 10, in the case where the storage system 100 has received a read request from the host 2. A transfer route (transfer route from the host 2 to the drive 31) in the second read process in this example below is a transfer route via the FC chip #2A, the CPU #2A, the memory #2B, and the CPU #2B of the cluster #2 and via the CPU #1A, the memory #1B, the CPU #1B, and the SAS chip #1B of the cluster #1.

In step S2201, the host 2 transmits, with respect to the storage system 100, a read request (RR) designating an LUN and an LBA of an LU of a read destination. The FC chip #2A receives the read request.

In step S2202, the FC chip #2A calculates the CPU #2A of a transfer destination based on the received read request. The FC chip #1A transfers the read request to the CPU #2A. The CPU #2A receives the read request.

In step S2203, the CPU #2A transfers the received read request to the CPU #1B of the cluster 1. The CPU #1B receives the read request.

In step S2204, the CPU #1B creates the routing information 610 based on the received read request. Specifically, for example, the CPU #1B calculates, from the read request, the drive 31 ("target drive" in the description of FIG. 22 below) of a storage destination of read data, the SAS chip 14 for accessing the target drive 31, and an address of the memory ("target memory" in the description of FIG. 22 below) 12 that temporarily stores read data read from the target drive 31. The CPU #1B updates each value of a bit corresponding to a physical device (i.e., the SAS chip #1B, the CPU #1B, and the memory #1B) belonging to a transfer route from the target drive 31 to the target memory 12 in the routing information 610 to "1."

In step S2205, the CPU #1B creates a transfer indication #10 and transmits the transfer indication #10 to the SAS chip #1B. The SAS chip #1B receives the transfer indication #10. One example of the transfer indication #10 is shown in FIG. 23*a*. The transfer indication #10 is a command indicating transfer of read data based on the read request received in S2202. Specifically, for example, the transfer indication #10 stores a command indicating a read of read data, an address of a transfer source of read data, an address of a transfer destination of read data, and a transfer length of read data and is added with the DIF code 503. In a part of the added DIF code 503, the routing information 1 created in S2204 is embedded. The SAS chip #1B temporarily stores the transfer indication #10 in a memory, not shown, of itself.

In step S2206, the SAS chip #1B transmits a data request (DR) for read data to the target drive 31. The target drive 31 receives the data request.

In step S2207, the target drive 31 transmits read data (read data #1) based on the data request to the SAS chip #1B. The SAS chip #1B receives read data #4. The read data #4 is stored in a storage area of the drive 31 in a state where the DIF code 503 embedded with the routing information 610 at the time of a write process is added to the block data 501. Specifically, for example, the routing information 610 within the read data #4 shows all physical devices included in a transfer route at the time of a write process.

In step S2208, the SAS chip #1B checks for an error in the block data 501 within the read data #4 based on a DIF CRC within the received read data #4. In the case where an error in the block data 501 is detected, the SAS chip #1B notifies the error with respect to the CPU 12. The CPU 12 to which the error is notified may be any CPU 12 in the cluster 1 or cluster 2. An error notification may be stored in any memory 13 in the cluster to which the error is notified.

In step S2209, the SAS chip #1B updates read data. In other words, the SAS chip #1B creates read data #5 from the read data #4. Specifically, for example, the read data #5 is data in which the routing information 610 in the DIF code 503 added to the read data #4 is updated. In the routing information 601 within the read data #5 in an example in FIG. 24, the value of a bit corresponding to a physical device (the SAS chip #1A, the CPU #1A, the memory #1A, and the FC chip #1A) included in the routing information 610 of the read data #4 and the value of a bit corresponding to a physical device (the SAS chip #1B, the CPU #1B, and the memory #1B) included in the routing information 610 within the transfer indication #10 received in S2205 are respectively "1."

In step S2210, the SAS chip #1B transmits the read data #5 to the CPU #1B based on the routing information 610 included in the read data #5. The CPU #1B receives the read data #5.

In step S2211, the CPU #1B stores the read data #5 in the memory #1B based on the routing information 610 included in the read data #5.

In step S2212, the CPU #1B updates the routing information 610. Specifically, for example, the CPU #1B updates the value of a bit corresponding to the CPU #2B of a transfer destination in the routing information 610 to "1" in the routing information 610. In this example, the CPU #1B is specified as the CPU 12 that reads read data into the memory #1B from the target drive 31 via the SAS chip 13, the CPU #1A as the CPU 12 with which read data is read from the memory #1B and transferred to the cluster 2, the CPU #2B as the CPU 12 that receives read data from the cluster #1, and the CPU #2A of the cluster #2 as the CPU 12 that transmits read data to the host 2 via the FC chip #2A in the second read process, for example. Therefore, the CPU #1B updates the value of a bit corresponding to the CPU #2B in the routing information 610 to "1." The respective roles of the CPUs 12 in the respective clusters may be specified in any way, and one CPU 12 may have all roles for each cluster.

In step S2213, the CPU #1B transfers the routing information 610 updated in S2212 to the cluster #2. The CPU #2B receives the routing information 610.

In step S2214, the CPU #1B transmits the read request (RR) received in S2203 to the cluster #2. The CPU #2B receives the read request.

In step S2215, the CPU #2B transmits a data request (DR) to the cluster #1 in response to the read request. The CPU #1A that has a role of transmitting read data to the cluster 2 receives the data request.

In step S2217, the CPU #1A acquires the read data #5 from the memory #1B based on the data request (DR).

In step S2218, the CPU #1A transmits the acquired read data #5 to the cluster #2 based on the data request (DR). The CPU #2B receives the read data #5.

In step S2219, the CPU #2B stores the received read data #5 in the memory #2B.

In step S2220, the CPU #2B updates the routing information 610. Specifically, for example, the CPU #2B updates a bit corresponding to the memory #2B of a storage destination of the read data #5 to "1" in the routing information 610.

In step S2221, the CPU #2B transmits the routing information 3 to the CPU #2A in response to the read request. The CPU #2A receives the routing information 610.

In step S2222, the CPU #2A transmits the read request (RR) to the CPU #2A. The CPU #2A receives the read request.

Figure 23B:
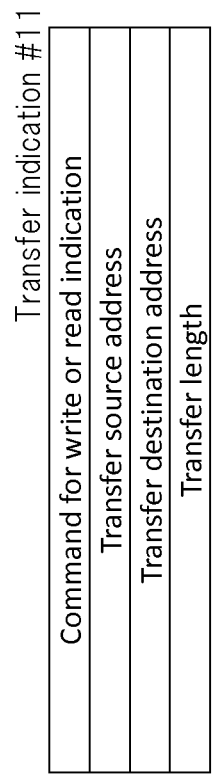
FIG. 23b shows one example of the transfer indication #10.

In step S2223, the CPU #2A creates a transfer indication #11 and transmits the transfer indication #11 to the FC chip #2A. The FC chip #2A receives the transfer indication #11. The transfer indication #11 is a command indicating transfer of read data based on the read request (RR) received in S2222. One example of the transfer indication #11 is shown in FIG. 23b. The transfer indication #11 is not added with the DIF code 503 including the routing information 610 and includes only a command indicating a read, an address of a transfer source and transfer destination of read data, and a transfer length, for example.

In step S2224, the FC chip #2A transmits a data request (DR) to the cluster #2 in response to the transfer indication #11. The CPU #2A receives the data request.

In step S2226, the CPU #2A acquires the read data #5 from the memory #2B based on the data request (DR).

In step S2227, the CPU #2A transmits the acquired read data #5 to the FC chip #2A. The FC chip #2A receives the read data #5.

In step S2228, the FC chip #2A checks for an error in the block data 501 within the read data #5 based on a DIF CRC within the received read data #5. In the case where an error in the block data 501 is detected at this time, the FC chip #2A notifies the error with respect to the CPU 12. The CPU 12 to which the error is notified may be any CPU 12 in the cluster 1 or cluster 2. An error notification may be stored in any memory 13 in the cluster to which the error is notified.

Figure 24:
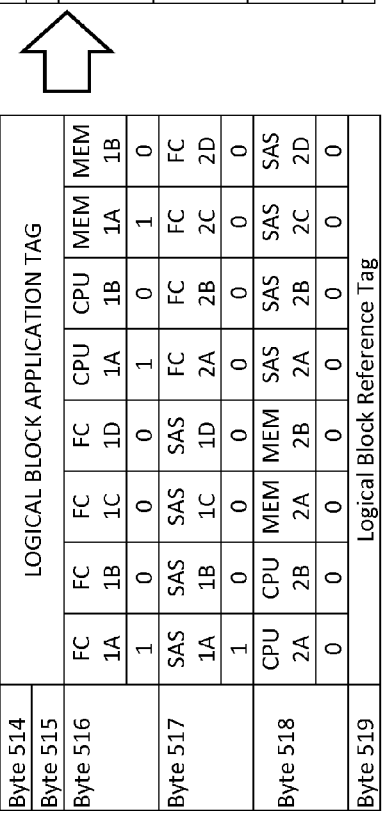
FIG. 24 shows the flow of read data in the second read process.

In step S2229, the FC chip #2A updates read data. In other words, the FC chip #2A creates read data #6 from the read data #5. For example, the read data #6 is data in which the DIF code 503 is deleted from the read data #5 (i.e., data of only the block data 501), as shown in FIG. 24.

In step S2230, the FC chip #2A transmits the read data #6 to the host 2. The host 2 receives the read data #6.

The process described above basically has a similar effect to the first read process. In addition, a fault device can be identified even with the storage control apparatus 1 including two or more clusters 10 having redundancy.

In the process described above, two CPUs 12 in each of the two clusters 10 have been used in data transfer based on the read request. Specifically, the CPU #1B that acquires read data from the drive 31 via the SAS chip #1B, the CPU #1A and the CPU #2B that perform data transfer between clusters, and the CPU #2A that transmits read data to the host 2 via the FC chip #2A have been used. By two CPUs 12 being provided to each one of the clusters 10 in this manner, parallel processing is made possible as described above, and prompt processing can be performed. Even if a fault has occurred in any of the CPUs 12, other CPUs 12 can continue processing. Therefore, redundancy can be maintained, and the CPU 12 with a fault can be identified.

It should be noted that creation of the routing information 610 is performed by the CPU #1B in the process described above, but may be performed by the CPU #1A. In this case, the CPU #1B transmits only the read request to the CPU #1A after storing the read data #5 in the memory #1B in S2211, without executing S2212, 2213, and 1412, for example. It may be such that the CPU #1A receives the read request, updates the value of a bit corresponding to itself (CPU #1A) in the routing information 610 to "1," and transmits the routing information 610 after update and the read request to the CPU #2B. Accordingly, in the cluster #1, a creation (update) process for the routing information 610 performed by the CPU 12 can be decentralized, and the load of the CPU #1B is reduced.

One example and a modified example thereof have been described above. However, the present invention is not limited to the example and modified example, and various changes are obviously possible without departing from the gist thereof.

REFERENCE SINGS LIST

1 Storage control apparatus
10 Cluster
11 FC protocol chip
12 CPU
13 Memory
14 SAS protocol chip

The invention claimed is:

1. A storage control apparatus that is coupled to one or more storage devices and one or more host computers and configured to execute, in response to an input/output (I/O) request from a host computer out of the one or more host computers, an I/O process in which I/O of I/O target data according to the I/O request is performed with respect to a storage device, which is an I/O destination, out of the one or more storage devices, the storage control apparatus comprising:

a plurality of physical devices included in a plurality of transfer routes coupled to the one or more host computers, the plurality of physical devices including a plurality of front-end interface devices (FE I/Fs) coupled to the one or more host computers, a plurality of back-end interface devices (BE I/Fs) coupled to the one or more storage devices, one or more memories, and one or more processors, each transfer route including an FE I/F out of the plurality of FE I/Fs, a BE I/F out of the plurality of BE I/Fs, at least one memory out of the one or more memories, and at least one processor out of the one or more processors, the I/O target data being transferred via a target transfer route that is a transfer route including an FE I/F that has received the I/O request out of the plurality of transfer routes, a processor in the target transfer route being configured to generate routing information representing a physical device included in the target transfer route, and transmit a transfer indication including the routing information to at least one of the FE I/F and BE I/F in the target transfer route, and at least one of the FE I/F and BE I/F in the target transfer route being configured to add, to the I/O target data, a guarantee code that is a code with which an error in data is detected and that includes routing information within the transfer indication, in response to the transfer indication.

2. The storage control apparatus according to claim 1, wherein at least one of the FE I/F and BE I/F in the target transfer route is configured to:

check the guarantee code added to the I/O target data; and
transmit, in a case where an error in the I/O target data is detected, an error notification of the error to at least one processor in the target transfer route, and a processor that has received the error notification is configured to acquire, based on the error notification, routing information included in the guarantee code added to the I/O target data.

3. The storage control apparatus according to claim 2, wherein at least one memory out of the one or more memories is configured to store error count information showing a count of data error of each of the plurality of physical devices, and
    a processor that has received the error notification is configured to update error counts of all physical devices included in the target transfer route based on the acquired routing information.

4. The storage control apparatus according to claim 3, wherein at least one memory out of the one or more memories is configured to store threshold information showing a threshold for an error count of each of the plurality of physical devices, and
    a processor that has received the error notification is configured to identify a physical device the error count of which has exceeded the threshold as a fault device in which a fault has occurred, based on the error count information and the threshold information.

5. The storage control apparatus according to claim 1, wherein the target transfer route includes a plurality of processors, and the plurality of processors in the target transfer route includes a first processor belonging to a first transfer route portion that is a transfer route portion from the FE I/F in the target transfer route to at least one memory out of one or more memories in the target transfer route, and a second processor belonging to a second transfer route portion that is a transfer route portion from at least one memory out of one or more memories in the target transfer route to the BE I/F in the target transfer route.

6. The storage control apparatus according to claim 1, wherein, in a case where the I/O process is a write process,
    a processor in the target transfer route is configured to store, via a BE I/F that has added a guarantee code including the routing information to write target data, the write target data in a storage device, which is a write destination, out of the one or more storage devices.

7. The storage control apparatus according to claim 1, comprising first and second controllers that are made redundant,
    wherein both of the first and second controllers are configured to be capable of independently executing an I/O process in which, in response to an I/O request from the host computer, I/O of I/O target data according to the I/O request is performed with respect to a storage device, which is an I/O destination, out of the one or more storage devices,
    each of the first and second controllers includes a plurality of physical devices including at least one FE I/F, at least one BE I/F, at least one processor, and at least one memory, and
    the target transfer route includes the FE I/F, processor, and memory of the first controller and the processor, memory, and BE I/F of the second controller.

8. The storage control apparatus according to claim 1, wherein at least one transfer route out of the plurality of transfer routes includes a storage device, which is an I/O destination, out of the one or more storage device.

9. A storage system comprising:
    one or more storage devices;
    a storage control apparatus that is coupled to one or more host computers and the one or more storage devices and configured to execute, in response to an input/output (I/O) request from a host computer out of the one or more host computers, an I/O process in which I/O of I/O target data according to the I/O request is performed with respect to a storage device, which is an I/O destination, out of the one or more storage devices,
    the storage control apparatus including a plurality of physical devices included in a plurality of transfer routes coupled to the one or more host computers,
    the plurality of physical devices including a plurality of front-end interface devices (FE I/Fs) coupled to the one or more host computers, a plurality of back-end interface devices (BE I/Fs) coupled to the one or more storage devices, one or more memories, and one or more processors,
    each transfer route including an FE I/F out of the plurality of FE I/Fs, a BE I/F out of the plurality of BE I/Fs, at least one memory out of the one or more memories, and at least one processor out of the one or more processors,
    the I/O target data being transferred via a target transfer route that is a transfer route including an FE I/F that has received the I/O request out of the plurality of transfer routes,
    a processor in the target transfer route being configured to generate routing information representing a physical device included in the target transfer route, and transmit a transfer indication including the routing information to at least one of the FE I/F and BE I/F in the target transfer route, and
    at least one of the FE I/F and BE I/F in the target transfer route being configured to add, to the I/O target data, a guarantee code that is a code with which an error in data is detected and that includes routing information within the transfer indication, in response to the transfer indication.

10. The storage system according to claim 9, wherein at least one of the FE I/F and BE I/F in the target transfer route is configured to:
    check the guarantee code added to the I/O target data; and
    transmit, in a case where an error in the I/O target data is detected, an error notification of the error to at least one processor in the target transfer route, and
    a processor that has received the error notification is configured to acquire, based on the error notification, routing information included in the guarantee code added to the I/O target data.

11. The storage system according to claim 10, wherein at least one memory out of the one or more memories is configured to store error count information showing a count of data error of each of the plurality of physical devices, and
    a processor that has received the error notification is configured to update error counts of all physical devices included in the target transfer route based on the acquired routing information.

12. The storage system according to claim 11, wherein at least one memory out of the one or more memories is configured to store threshold information showing a threshold for an error count of each of the plurality of physical devices, and
    a processor that has received the error notification is configured to identify a physical device the error count of which has exceeded the threshold as a fault device in which a fault has occurred, based on the error count information and the threshold information.

13. The storage system according to claim 9, wherein the target transfer route includes a plurality of processors, and the plurality of processors in the target transfer route includes a first processor belonging to a first transfer route portion that is a transfer route portion from the FE I/F in the target transfer route to at least one memory out of one or more memories in the target transfer route, and a second processor belonging to a second transfer route portion that is a transfer route portion from at least one memory out of one or more memories in the target transfer route to the BE I/F in the target transfer route.

14. A fault detection method for a storage system configured to execute, in response to an input/output (I/O) request from a host computer out of one or more host computers, an I/O process in which I/O of I/O target data according to the I/O request is performed with respect to a storage device, which is an I/O destination, out of the one or more storage devices, the storage system including a plurality of physical devices included in a plurality of transfer routes coupled to the one or more host computers, the plurality of physical devices including a plurality of front-end interface devices (FE I/Fs) coupled to the one or more host computers, a plurality of back-end interface devices (BE I/Fs) coupled to the one or more storage devices, one or more memories, and one or more processors, each transfer route including an FE I/F out of the plurality of FE I/Fs, a BE I/F out of the plurality of BE I/Fs, at least one memory out of the one or more memories, and at least one processor out of the one or more processors, the storage system being configured to transfer the I/O target data via a target transfer route out of the plurality of transfer routes, and the target transfer route being a transfer route including a FE I/F that has received the I/O request, the fault detection method comprising:

causing a processor in the target transfer route to generate routing information representing a physical device included in the target transfer route, and transmit a transfer indication including the routing information to at least one of the FE I/F and BE I/F in the target transfer route; and causing at least one of the FE I/F and BE I/F in the target transfer route to add, to the I/O target data, a guarantee code that is a code with which an error in data is detected and that includes routing information within the transfer indication, in response to the transfer indication.

15. The fault detection method according to claim 14, wherein at least one of the FE I/F and BE I/F in the target transfer route:

checks the guarantee code added to the I/O target data; and transmits, in a case where an error in the I/O target data is detected, an error notification of the error to at least one processor in the target transfer route, and a processor that has received the error notification acquires, based on the error notification, routing information included in the guarantee code added to the I/O target data.

* * * * *